(12) United States Patent
Lee et al.

(10) Patent No.: US 8,243,222 B2
(45) Date of Patent: Aug. 14, 2012

(54) ARRAY SUBSTRATE FOR LIQUID CRYSTAL DISPLAY DEVICE AND METHOD OF MANUFACTURING THE SAME

(75) Inventors: Chang-Bin Lee, Busan (KR); Byung-Kook Choi, Incheon (KR)

(73) Assignee: LG Display Co., Ltd., Seoul (KR)

( * ) Notice: Subject to any disclaimer, the term of this patent is extended or adjusted under 35 U.S.C. 154(b) by 260 days.

(21) Appl. No.: 12/831,328

(22) Filed: Jul. 7, 2010

(65) Prior Publication Data

US 2010/0273284 A1 Oct. 28, 2010

Related U.S. Application Data

(62) Division of application No. 11/638,437, filed on Dec. 14, 2006, now Pat. No. 7,768,587.

(30) Foreign Application Priority Data

Jun. 30, 2006 (KR) .............................. 2006-0060864

(51) Int. Cl.
*G02F 1/136* (2006.01)
*G02F 1/1343* (2006.01)

(52) U.S. Cl. ............. 349/43; 349/46; 349/141; 430/30; 257/59; 257/49

(58) Field of Classification Search .................... 349/43, 349/46, 141; 430/30; 257/59, 49
See application file for complete search history.

(56) References Cited

U.S. PATENT DOCUMENTS

| | | | |
|---|---|---|---|
| 6,028,653 A | 2/2000 | Nishida | |
| 6,275,275 B1 | 8/2001 | Ha | |
| 6,449,024 B1 | 9/2002 | Hirakata et al. | |
| 7,277,149 B2 | 10/2007 | Kim et al. | |
| 2002/0180900 A1 | 12/2002 | Chae et al. | |
| 2003/0058379 A1 | 3/2003 | Lee | |
| 2004/0012725 A1 | 1/2004 | Tomioka et al. | |
| 2006/0138416 A1* | 6/2006 | Park | 257/59 |
| 2006/0145161 A1* | 7/2006 | Lee et al. | 257/72 |
| 2006/0186411 A1* | 8/2006 | Kim et al. | 257/59 |
| 2006/0273315 A1* | 12/2006 | Ha et al. | 257/59 |

* cited by examiner

*Primary Examiner* — Huyen Ngo
(74) *Attorney, Agent, or Firm* — Morgan, Lewis & Bockius LLP

(57) ABSTRACT

A method of manufacturing an array substrate for a liquid crystal display device includes forming a gate electrode and a gate line on a substrate through a first mask process, forming a first insulating layer, an active layer, an ohmic contact layer, a buffer metallic layer, and a data line on the substrate including the gate electrode and the gate line through a second mask process, and forming a source electrode, a drain electrode, and a pixel electrode through a third mask process, the pixel electrode extending from the drain electrode, wherein the active layer is disposed over and within the gate electrode.

9 Claims, 32 Drawing Sheets

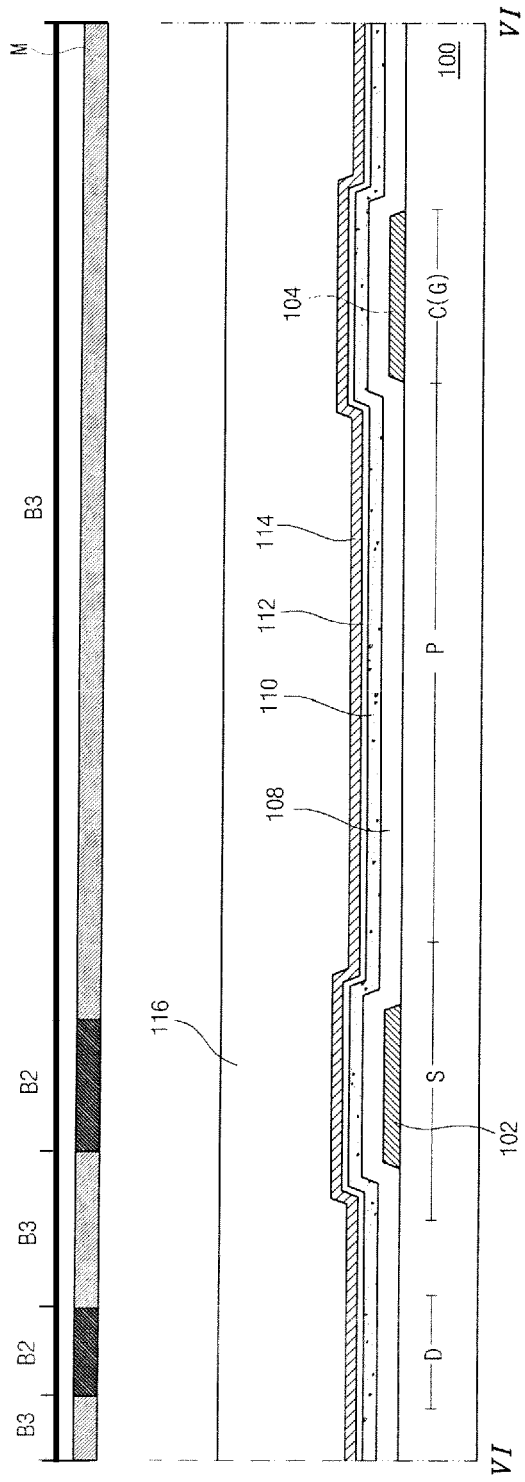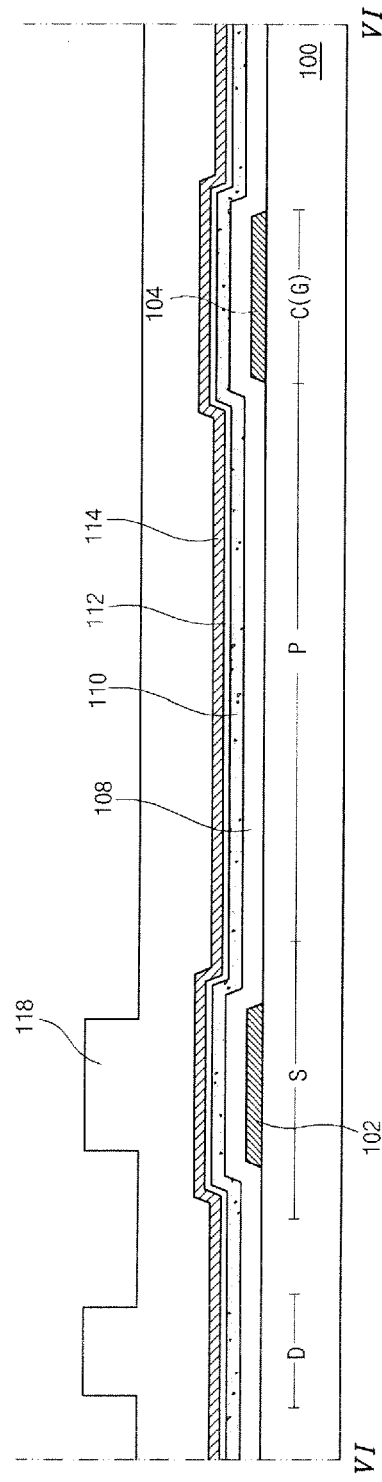

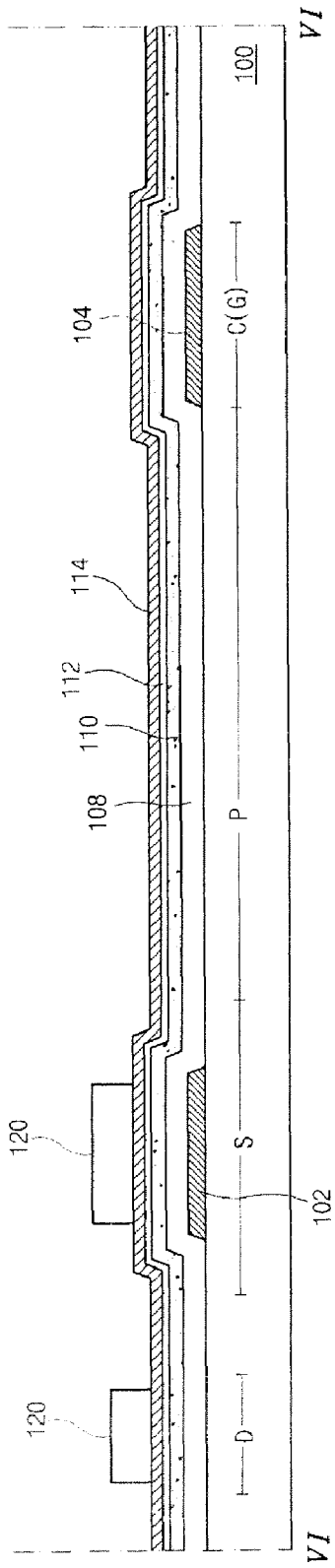
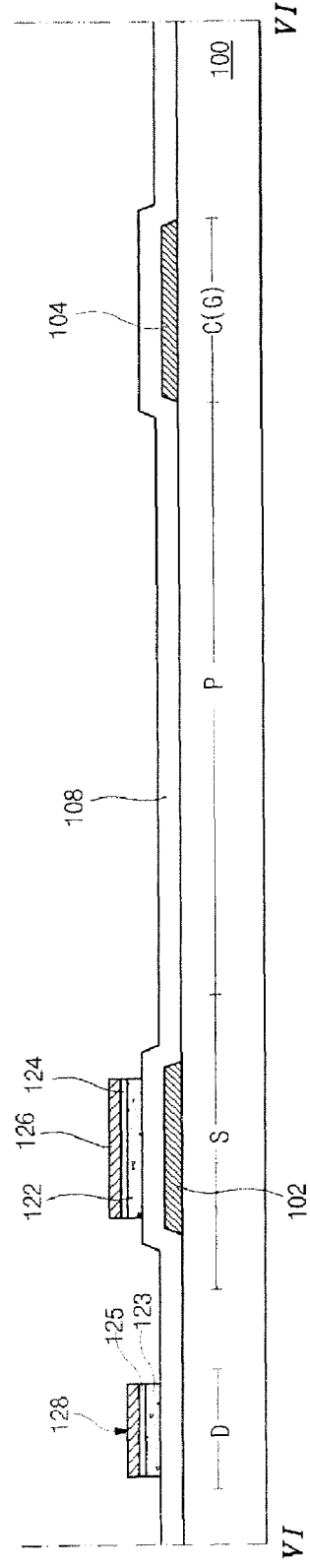
FIG. 9D
FIG. 9E

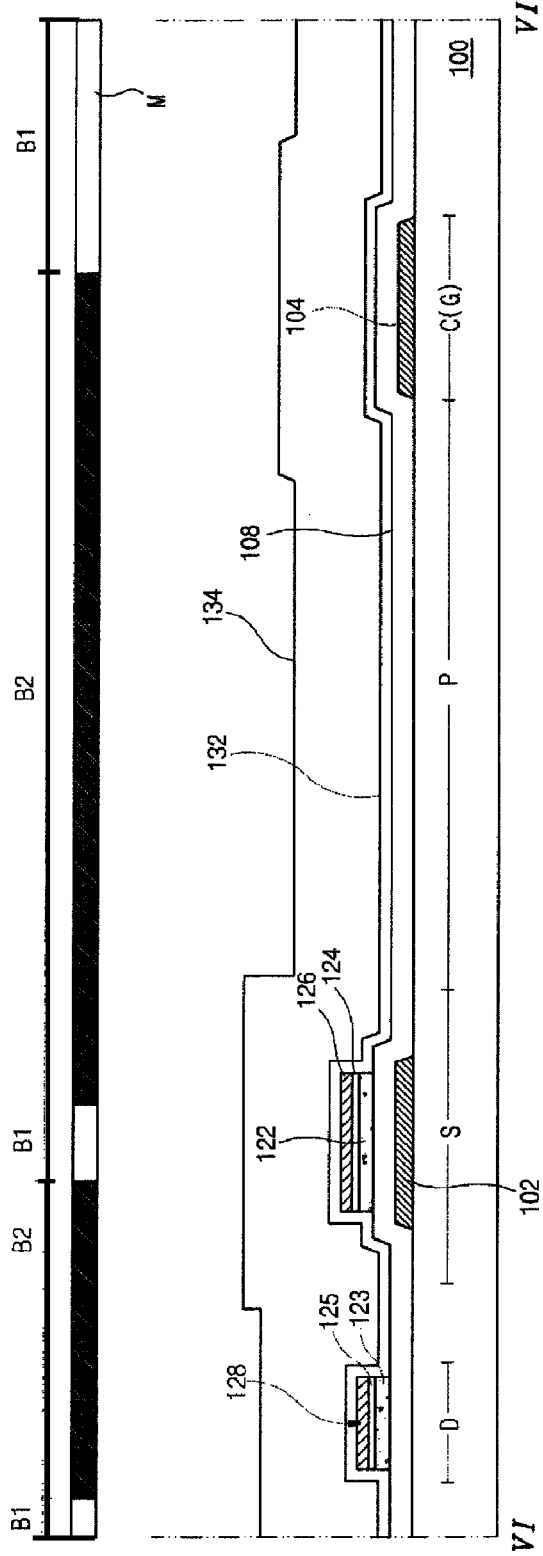
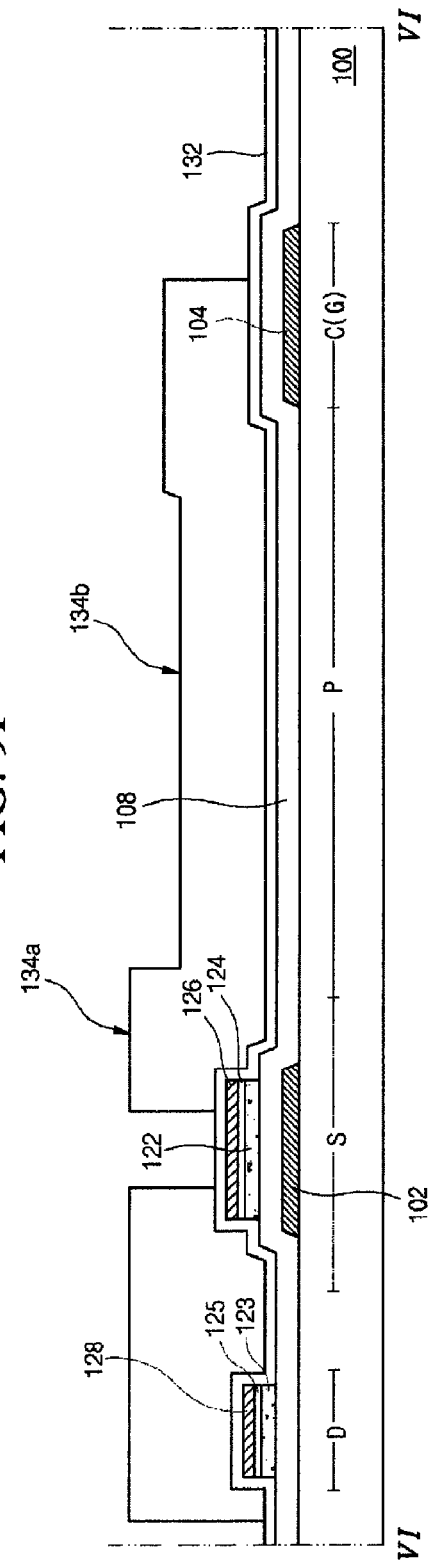
FIG. 9F
FIG. 9G though four mask processes according to the related art. In
ARRAY SUBSTRATE FOR LIQUID CRYSTAL DISPLAY DEVICE AND METHOD OF MANUFACTURING THE SAME This is a divisional application of copending application Ser. No. 11/638,437, filed on Dec. 14, 2006 now U.S. Pat. No. 7,768,587, which is hereby incorporated by reference. This application claims the benefit of Korean Patent Application No. 2006-0060864, filed in Korea on Jun. 30, 2006, which is hereby incorporated by reference.

BACKGROUND OF THE INVENTION

1. Field of the Invention

The present invention relates to a liquid crystal display device, and more particularly, to an array substrate for a liquid crystal display (LCD) device and a method of manufacturing the same.

2. Discussion of the Related Art

Liquid crystal display ("LCD") devices are driven based on optical anisotropy and polarization characteristics of a liquid crystal material. Liquid crystal molecules have a long and thin shape, and the liquid crystal molecules are regularly arranged along a certain direction. An alignment direction of the liquid crystal molecules depends on the intensity and the direction of an electric field applied to the liquid crystal molecules. Light passes through the LCD device along the alignment direction of the liquid crystal molecules. By controlling the intensity or the direction of the electric field, the alignment direction of the liquid crystal molecules changes and images are displayed.

Generally, an LCD device includes two substrates, which are spaced apart facing each other, and a liquid crystal layer interposed between the two substrates. Each of the substrates includes an electrode. The electrodes from respective substrates face each other. An electric field is induced between the electrodes by applying a voltage to each electrode. An alignment direction of liquid crystal molecules changes in accordance with a variation in the intensity or the direction of the electric field. Normally, the direction of the electric field is perpendicular to the substrates. Active matrix liquid crystal display ("AMLCD") devices, which include thin film transistors as switching devices for a plurality of pixels, have been widely used due to their high resolution and ability to display images moving fast.

The LCD device will be described hereinafter with reference to accompanying drawings. FIG. 1 is a schematic perspective view of an LCD device according to the related art. In FIG. 1, an LCD device 51 includes a first substrate 5 and a second substrate 10 spaced apart from each other. A liquid crystal layer (not shown) is interposed between the first and second substrates 5 and 10. A black matrix 6 and a color filter layer (7a, 7b, and 7c) is formed on an inner surface of the first substrate 5, which faces the second substrate 10. A common electrode 9 is formed on the color filter layer (7a, 7b, and 7c.). The color filter layer (7a, 7b, and 7c) includes color filters of red, green and blue 7a, 7b, and 7c.

Gate lines 14 and data lines 26 are formed on an inner surface of the second substrate 10, which faces the first substrate 5. The gate lines 14 and the data lines 26 cross each other to define pixel regions P. A thin film transistor T is formed at each crossing point of the gate and data lines 14 and 26. A pixel electrode 32 is formed in each pixel region P and is connected to the thin film transistor T. The pixel electrode 32 is formed of a transparent conductive material that transmits light relatively well, such as indium tin oxide (ITO).

The first substrate 5, which includes the black matrix 6, the color filter layer, and the common electrode 9, may be referred to as a color filter substrate. The second substrate 10, which includes the gate lines 14, the data lines 26, the thin film transistors T, and the pixel electrodes 32, may be referred to as an array substrate.

The array substrate may be manufactured through five or six mask processes. An example of manufacturing an array substrate through five mask processes is as follows. Gate lines, gate electrode and gate pads are formed on a substrate through a first mask process. Active layers and ohmic contact layers are formed through a second mask process. Data lines, source electrodes, drain electrodes and data pads are formed through a third mask process. A passivation layer is formed substantially on an entire surface of the substrate, and contact holes exposing the drain electrodes are formed in the passivation layer through a fourth mask process. Pixel electrodes, which are connected to the drain electrodes through the contact holes, are formed through a fifth mask process.

The mask process includes many steps of coating a thin film with photoresist, exposing the photoresist to light, developing the photoresist, etching the thin film, and removing the photoresist. As the number of mask processes increases, manufacturing costs and time increase correspondingly. In addition, the probability that problems may occur also increases, resulting in a decrease in the productivity.

To solve the problems, four mask processes for manufacturing the array substrate have been proposed. FIG. 2 is a plan view of an array substrate for an LCD device manufactured through four mask processes according to the related art. In FIG. 2, gate lines 62 are formed on a substrate 60, and data lines 98 cross the gate lines 62 to define pixel regions P. A gate pad 66 is formed at one end of each gate line 62, and a data pad 99 is formed at one end of each data line 98. A gate pad electrode GP is formed on the gate pad 66 and contacts the gate pad 66. A data pad electrode DP is formed on the data pad 99 and contacts the data pad 99. A thin film transistor T is formed at each crossing point of the gate and data lines 62 and 98. The thin film transistor T includes a gate electrode 64, a first semiconductor layer 90a, and source and drain electrodes 94 and 96. The gate electrode 64 is connected to the gate line 62. The first semiconductor layer 90a is disposed over the gate electrode 64. The source and drain electrodes 94 and 96 are formed on the first semiconductor layer 90a and are spaced apart from each other. The source electrode 94 is connected to the data line 98. A transparent pixel electrode PXL is formed in each pixel region P. The pixel electrode PXL is connected to the drain electrode 96.

A metallic layer 86 is formed over a part of each gate line 62 and is connected to the pixel electrode PXL. The metallic layer 86 has an island shape. The gate line 62 and the metallic layer 86 form a storage capacitor Cst with a gate insulating layer (not shown) interposed therebetween. The gate line 62 functions as a first electrode, the metallic layer 86 functions as a second electrode, and the gate insulating layer functions as a dielectric substance. A second semiconductor layer 90b is formed under the data line 98. A third semiconductor layer 90c is formed under the metallic layer 86. The second semiconductor layer 90b extends from the first semiconductor layer 90a.

In the array substrate manufactured through four mask processes, intrinsic amorphous silicon layers are exposed at edges of the source and drain electrodes 94 and 96 and the data line 98. When the intrinsic amorphous silicon layers are exposed to light, photo-leakage currents are generated. The photo-leakage current couples with the pixel electrode PXL and causes wavy noise in the image displayed.

FIGS. 3A and 3B are cross-sectional views along the line II-II and the line V-V of FIG. 2, respectively, of an array substrate according to the related art. In FIGS. 3A and 3B, when the array substrate is manufactured through a four mask process, a first semiconductor layer 90a is formed under both source and drain electrodes 94 and 96, and a second semiconductor layer 90b is formed under the data line 98. Each of the first and second semiconductor layers 90a and 90b includes an intrinsic amorphous silicon layer (a-Si:H) and an impurity-doped amorphous silicon layer (for example, n+a-Si:H). The intrinsic amorphous silicon layer of the first semiconductor layer 90a is referred to as an active layer 92a, and the impurity-doped amorphous silicon layer of the first semiconductor layer 90a is referred to as an ohmic contact layer 92b. The intrinsic amorphous silicon layer 70 of the second semiconductor layer 90b is exposed at both sides of the data line 98, and the active layer 92a is exposed at sides of the source and drain electrodes 94 and 96. That is, the intrinsic amorphous silicon layer 70 of the second semiconductor layer 90b has a larger area than the data line 98, and electrical conductivity increases in the intrinsic amorphous silicon layer 70 of the second semiconductor layer 90b. The intrinsic amorphous silicon layer 70 of the second semiconductor layer 90b is exposed to a light source (not shown), and photo-leakage currents are caused in the intrinsic amorphous silicon layer 70 of the second semiconductor layer 90b. The intrinsic amorphous silicon layer 70 is repeatedly activated and inactivated according to On/Off states of the light source, and the photo-leakage currents changes accordingly. The photo-leakage currents affect a parasitic capacitance between the data line 98 and the pixel electrode PXL, and the parasitic capacitance varies according to the change of the photo-leakage currents. Signals of the pixel electrode PXL also change. Therefore, the liquid crystal molecules over the pixel electrode PXL are distorted, resulting in wavy lines on the displayed image. Moreover, the photo-leakage currents in the active layer 92a cause additional problems in the operation of the thin film transistor T.

Meanwhile, the intrinsic amorphous silicon layer 70 of the second semiconductor layer 90b has a protruded part with a width of about 1.7 μm beyond each side of the data line 98. Generally, the data line 98 and the pixel electrode PXL have a separation of about 4.75 μm therebetween, considering the alignment margin. However, the distance "d" between the data line 98 and the pixel electrode PXL should be about 6.45 μm because of the protruded part. The pixel electrode PXL becomes more distant from the data line 98 by the width of the protruded part of the intrinsic amorphous silicon layer 70. A black matrix BM covering an area between the data line 98 and the pixel electrode PXL has a width W1. The aperture area decreases by W1 due to the black matrix BM. As stated above, the formation and structure of the second semiconductor layer 90 under the data line 98 are due to four mask processes. Hereinafter, four mask processes will be described with reference to accompanying drawings.

FIGS. 4A to 4G, FIGS. 5A to 5G and FIGS. 6A to 6G are cross-sectional views of an array substrate showing processes of manufacturing the same according to the related art. FIGS. 4A to 4G correspond to cross-sectional views along the line II-II of FIG. 2, FIGS. 5A to 5G correspond to cross-sectional views along the line III-III of FIG. 2, and FIGS. 6A to 6G correspond to cross-sectional views along the line IV-IV of FIG. 2.

FIG. 4A, FIG. 5A, and FIG. 6A show the array substrate in a first mask process. In FIG. 4A, FIG. 5A, and FIG. 6A, a switching region S, a pixel region P, a gate region G, a data region D, and a storage region C are defined on a substrate 60.

The pixel region P includes the switching region S. The gate region G includes the storage region C.

A gate line 62, a gate pad 66, and a gate electrode 64 are formed on the substrate 60 including the regions S, P, G, D and C. The gate pad 66 is formed at one end of the gate line 62. The gate electrode 64 is connected to the gate line 62 and is disposed in the switching region S. The gate line 62, the gate pad 66 and the gate electrode 64 are formed by depositing a conductive metal consisting of one or more material from a conductive metallic group including aluminum (Al), aluminum alloy (AlNd), tungsten (W), chromium (Cr), and molybdenum (Mo). The gate line 62, the gate pad 66 and the gate electrode 64 may be formed by a single layer of the above-mentioned metallic material or may be a double layer of aluminum (Al)/chromium (Cr) or aluminum (Al)/molybdenum (Mo).

FIGS. 4B to 4E, FIGS. 5B to 5E and FIGS. 6B to 6E show a second mask process. In FIG. 4B, FIG. 5B and FIG. 6B, a gate insulating layer 68, an intrinsic amorphous silicon layer (a-Si:H) 70, an impurity-doped amorphous silicon layer (n+ or p+a-Si:H) 72, and a conductive metallic layer 74 are formed substantially on an entire surface of the substrate 70 including the gate line 62, the gate pad 66 and the gate electrode 64.

The gate insulating layer 68 is formed of an inorganic insulating material including silicon nitride (SiNX) and silicon oxide (SiO2) or an organic insulating material including benzocyclobutene (BCB) and acrylic resin. The conductive metallic layer 74 is formed of a conductive metal consisting of one or more material from a conductive metallic group including aluminum (Al), aluminum alloy (AlNd), tungsten (W), chromium (Cr), and molybdenum (Mo).

A photoresist layer 76 is formed by coating an entire surface of the substrate 60 including the conductive metallic layer 74 with photoresist. A mask M is disposed over the photoresist layer 76. The mask M includes a light-transmitting portion B1, a light-blocking portion B2, and a light-half transmitting portion B3. The light-transmitting portion B1 transmits substantially all light. The photoresist layer 76 below the light-transmitting portion B1 is entirely exposed to light to thereby chemically change. The light-blocking portion B2 completely blocks the light. The light-half transmitting portion B3 includes slits or a half transparent layer to decrease the intensity of light or transmittance of the light. Thus, the photoresist layer is partially exposed to light therethrough.

The light-half transmitting portion B3 is disposed over the gate electrode 64 in the switching region S. The light-blocking portion B2 is disposed in the storage region C, in the switching region S and in the data region D. In the switching region S, the light-blocking portion B2 is disposed at both sides of the light-half transmitting portion B3. The light-transmitting portion B1 is disposed in other regions. The photoresist layer 76 is exposed to light through the mask M and then is developed.

In FIG. 4C, FIG. 5C and FIG. 6C, first, second and third photoresist patterns 78a, 78b and 78c are formed in the switching region S, the data region D, and the storage region C. The conductive metallic layer 74 is partially exposed. Next, the exposed conductive metallic layer 74, the impurity-doped amorphous silicon layer 72 thereunder, and the intrinsic amorphous silicon layer 70 are removed. The conductive metallic layer 74 may be removed simultaneously with the under layers 72 and 70. Alternatively, the conductive metallic layer 74 may be wet-etched. Then, the impurity-doped amorphous silicon layer 72 and the intrinsic amorphous silicon layer 70 may be dry-etched.

In FIG. 4D, FIG. 5D and FIG. 6D, a first metallic pattern 80, a second metallic pattern 82, and a third metallic pattern 86 are formed under the first, second, and third photoresist patterns 78a, 78b and 78c, respectively. Although not shown, the second metallic pattern 82 extends from the first metallic pattern 80 along a side of the pixel region P. The third metallic pattern 86 corresponds to the storage region C and has an island shape. A first semiconductor pattern 90a, a second semiconductor pattern 90b, and a third semiconductor pattern 90c are formed under the first metallic pattern 80, the second metallic pattern 82 and the third metallic pattern 86, respectively. Each of the first, second, and third semiconductor patterns 90a, 90b, and 90c includes the intrinsic amorphous silicon layer 70 and the impurity-doped amorphous silicon layer 72.

Next, an ashing process is performed to remove a part of the first photoresist pattern 78a corresponding to the gate electrode 64, and the first metallic pattern 80 is exposed. At this time, other parts of the first photoresist pattern 78a, the second photoresist pattern 78b, and the third photoresist pattern 78c are partially removed. The thicknesses of the first, second, and third photoresist patterns 78a, 78b and 78c are decreased. The first, second, and third metallic patterns 80, 82 and 86 are partially exposed at peripheries of the first, second and third photoresist patterns 78a, 78b and 78c.

In FIG. 4E, FIG. 5E and FIG. 6E, the exposed first metallic pattern 80 and the impurity-doped amorphous silicon layer 72 of the first semiconductor layer 90a of FIG. 4D are removed. A source electrode 94, a drain electrode 96, and an ohmic contact layer 92b are formed. The intrinsic amorphous silicon layer of the first semiconductor layer 90a functions as an active layer 92a. When the impurity-doped amorphous silicon layer 72 of the first semiconductor layer 90a in FIG. 4D is removed, the intrinsic amorphous silicon layer, i.e., the active layer 92a, is over-etched so that particles may not remain on the surface of the active layer 92a.

The second metallic pattern 82 of FIG. 6D, which contacts the source electrode 94, becomes a data line 98, and one end of the data line 98 becomes a data pad 99. The third metallic pattern 86 of an island shape and the gate line 62 in the storage region C function as electrodes for a capacitor. The gate line 62 functions as a first electrode, and the third metallic pattern 86 functions as a second electrode. The gate line 62, the gate insulating layer 68, the third semiconductor pattern 90c, and the third metallic pattern 86 constitute a storage capacitor Cst. Next, the photoresist patterns 78a, 78b and 78c are removed.

FIG. 4F, FIG. 5F and FIG. 6F show a third mask process. In FIG. 4F, FIG. 5F and FIG. 6F, a passivation layer PAS is formed substantially on an entire surface of the substrate 60 including the source and drain electrodes 94 and 96, the data line 98 including the data pad 99, and the storage capacitor Cst. The passivation layer PAS may be formed by depositing an inorganic insulating material selected from an inorganic insulating material group including silicon nitride (SiNx) and silicon oxide (SiO2). The passivation layer PAS may also be formed by coating the substrate 60 with an organic insulating material selected from an organic insulating material group including benzocyclobutene (BCB) and acrylic resin.

Subsequently, the passivation layer PAS is patterned to form a drain contact hole CH1, a storage contact hole CH2, a gate pad contact hole CH3, and a data pad contact hole CH4. The drain contact hole CH1 partially exposes the drain electrode 96. The storage contact hole CH2 exposes the third metallic pattern 86. The gate pad contact hole CH3 partially exposes the gate pad 66. The data pad contact hole CH4 partially exposes the data pad 99.

FIG. 4G, FIG. 5G and FIG. 6G show a fourth mask process. In FIG. 4G, FIG. 5G and FIG. 6G, a pixel electrode PXL, a gate pad electrode GP, and a data pad electrode DP are formed on the substrate 60 including the passivation layer PAS by depositing a conductive metal selected from a transparent conductive metallic group including indium tin oxide (ITO) and indium zinc oxide (IZO), and then patterning it. The pixel electrode PXL contacts the drain electrode 96 and the third metallic pattern 86. The gate pad electrode GP contacts the gate pad 66. The data pad electrode DP contacts the data pad 99.

The array substrate for a liquid crystal display device may be manufactured through the above-mentioned four mask processes. The manufacturing costs and time can be reduced. The probability that problems may occur also decreases.

However, in the array substrate manufactured through four mask processes, the semiconductor layer is exposed at both sides of the data line. The exposed semiconductor layer is affected by light and causes wavy noise on images that are displayed. In addition, the aperture ratio decreases due to the semiconductor layer.

SUMMARY OF THE INVENTION

Accordingly, the present invention is directed to the array substrate for liquid crystal display device and method of manufacturing the same that substantially obviates one or more problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method of manufacturing an array substrate for a liquid crystal display device includes forming a gate electrode and a gate line on a substrate through a first mask process, forming a first insulating layer, an active layer, an ohmic contact layer, a buffer metallic layer, and a data line on the substrate including the gate electrode and the gate line through a second mask process, and forming a source electrode, a drain electrode, and a pixel electrode through a third mask process, the pixel electrode extending from the drain electrode, wherein the active layer is disposed over and within the gate electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 9A to 9I, FIGS. 10A to 10I, and FIGS. 11A to 11I illustrate an array substrate showing processes of manufacturing the same according to the exemplary embodiment of the present invention.

DETAILED DESCRIPTION OF THE PREFERRED EMBODIMENTS

Reference will now be made in detail to the preferred embodiments of the present invention, examples of which are illustrated in the accompanying drawings.

In the present invention, an array substrate is manufactured through four mask processes in which an active layer of an island shape is formed over a gate electrode. According to the present invention, an amorphous silicon layer is not exposed beyond a data line. Therefore, the wavy noise is prevented.

Figure 1:
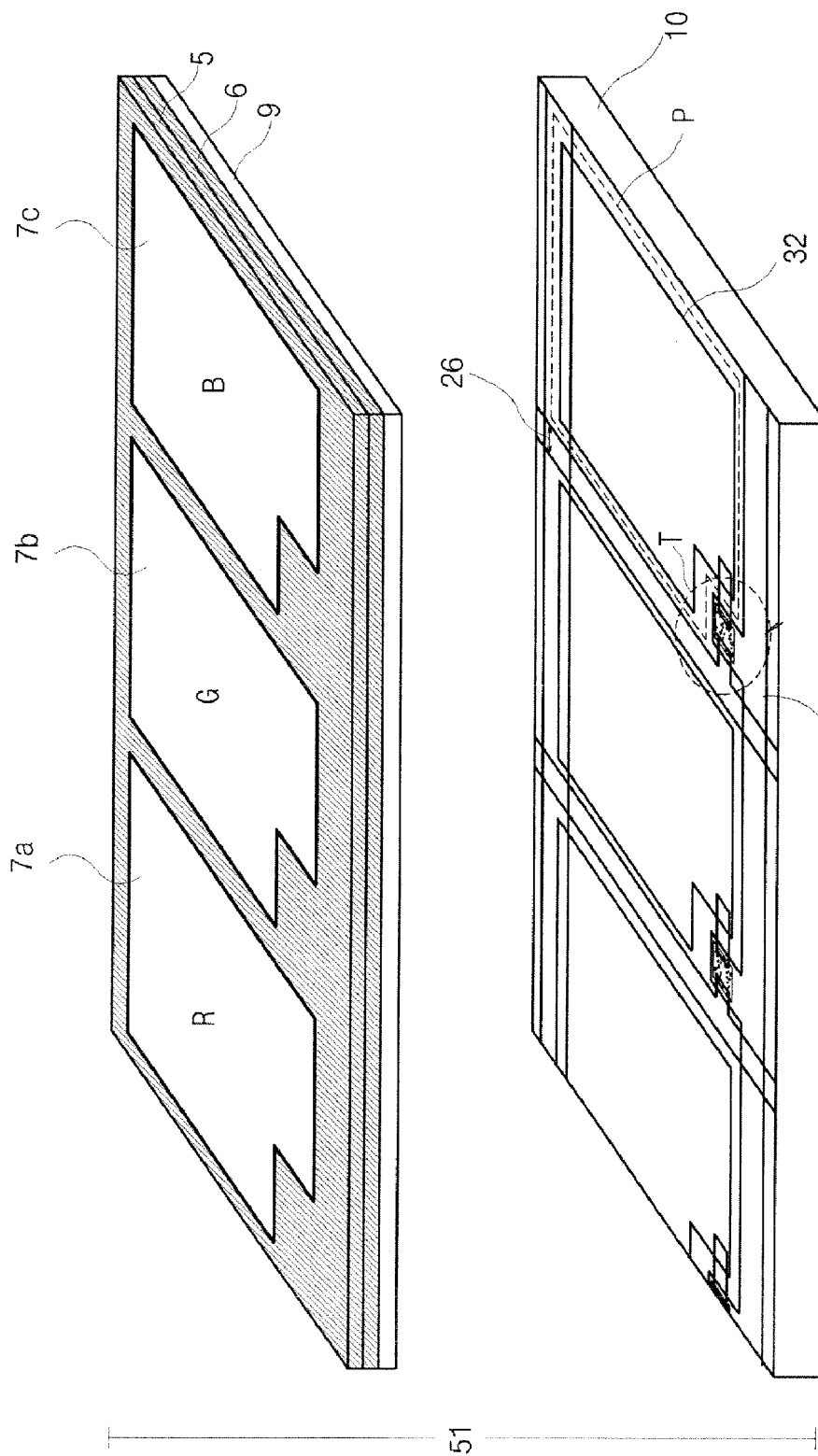
FIG. 1 is a schematic perspective view of an LCD device according to the related art.
Figure 2:
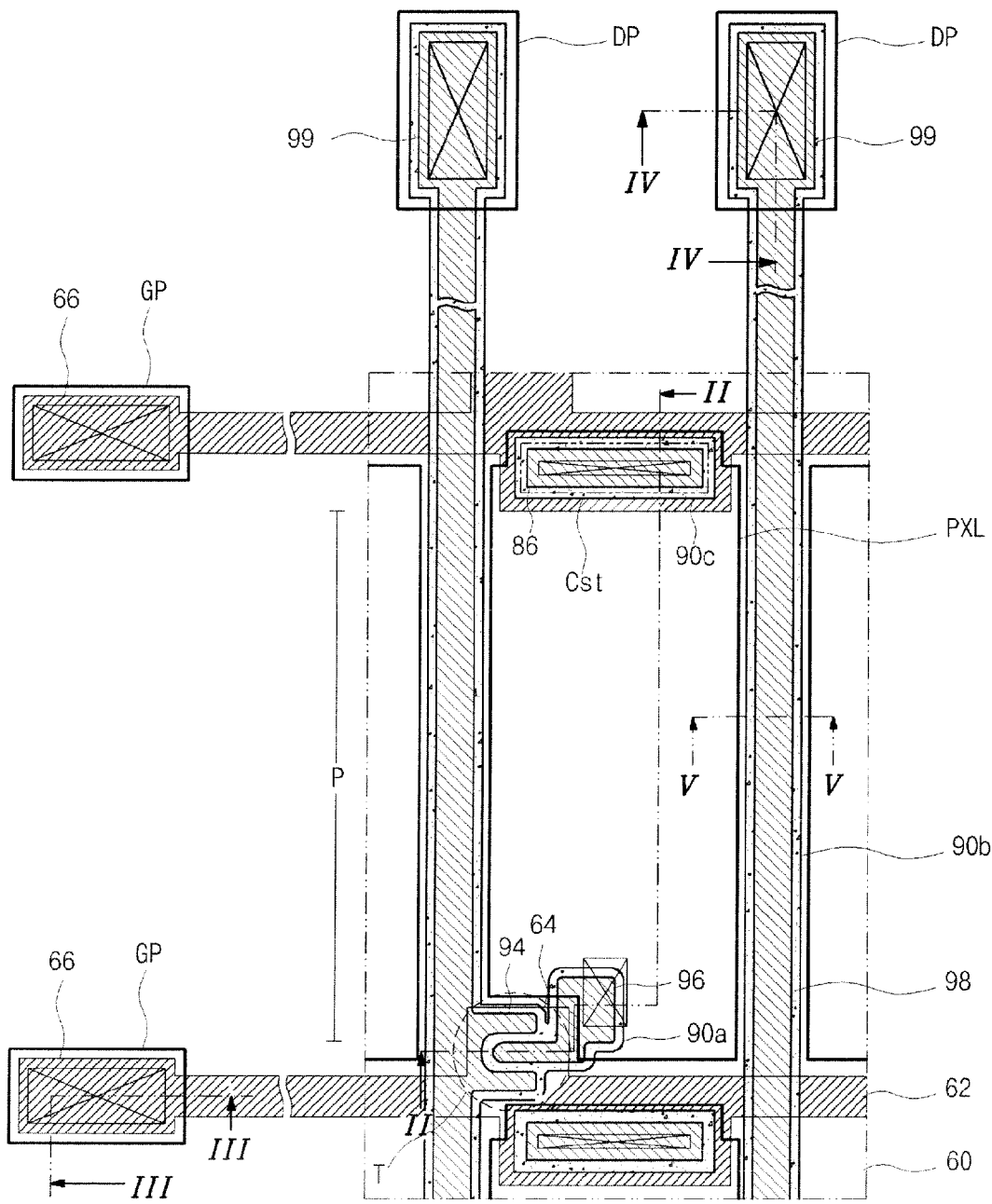
FIG. 2 is a plan view of an array substrate for an LCD device manufactured through four mask processes according to the related art.
Figure 3A:
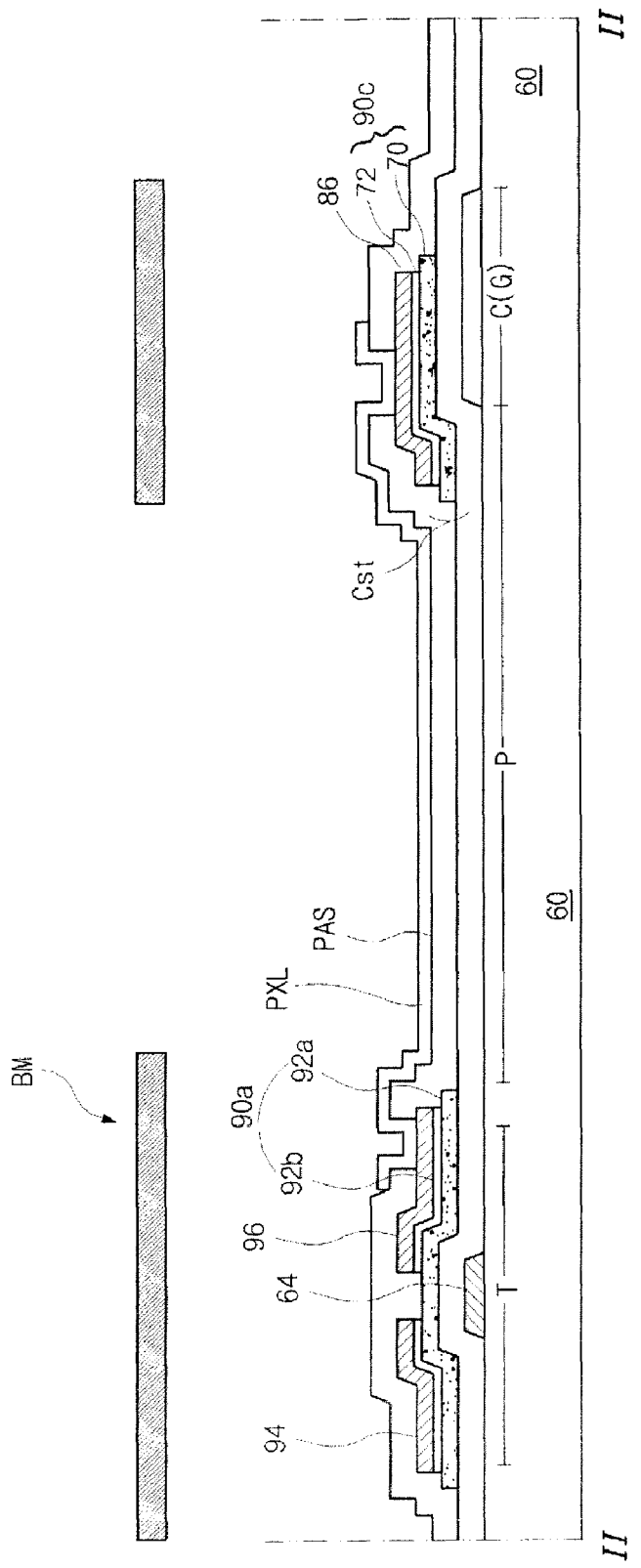
FIGS. 3A and 3B are cross-sectional views of an array substrate according to the related art.
Figure 3B:
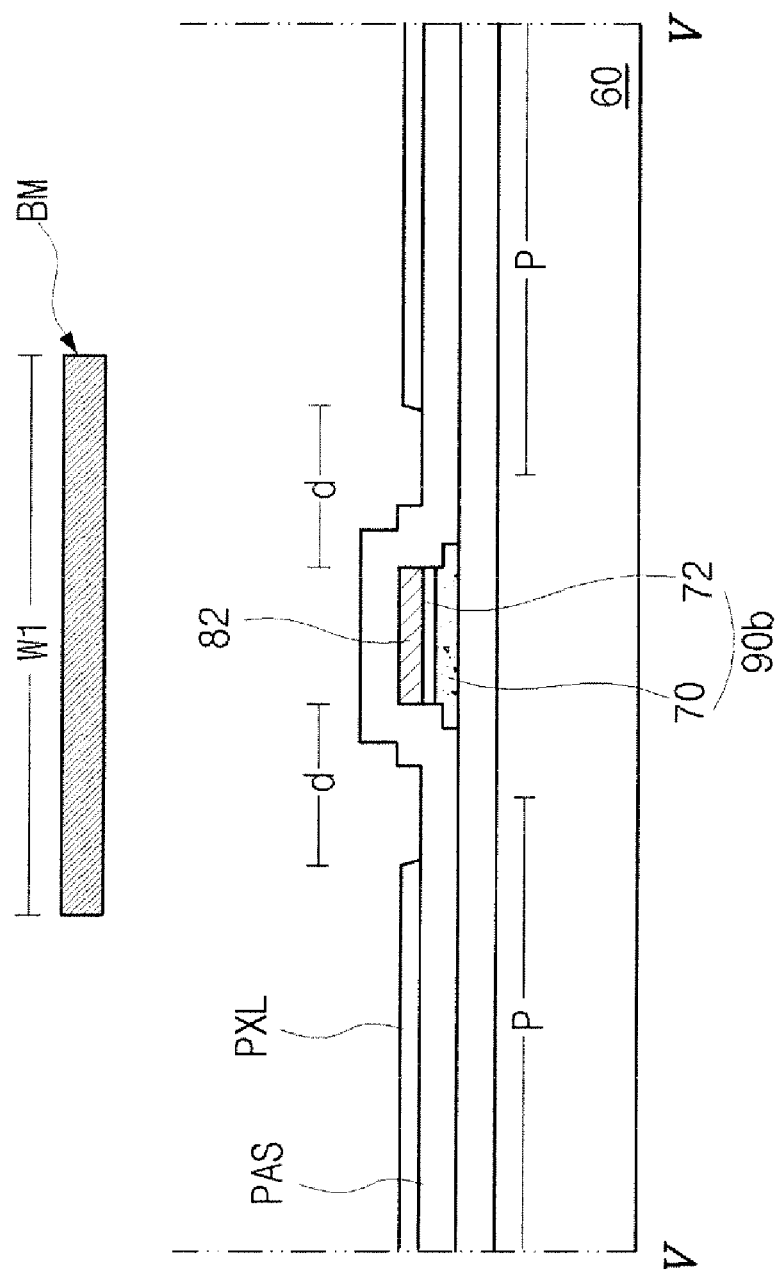
Figure 4A:
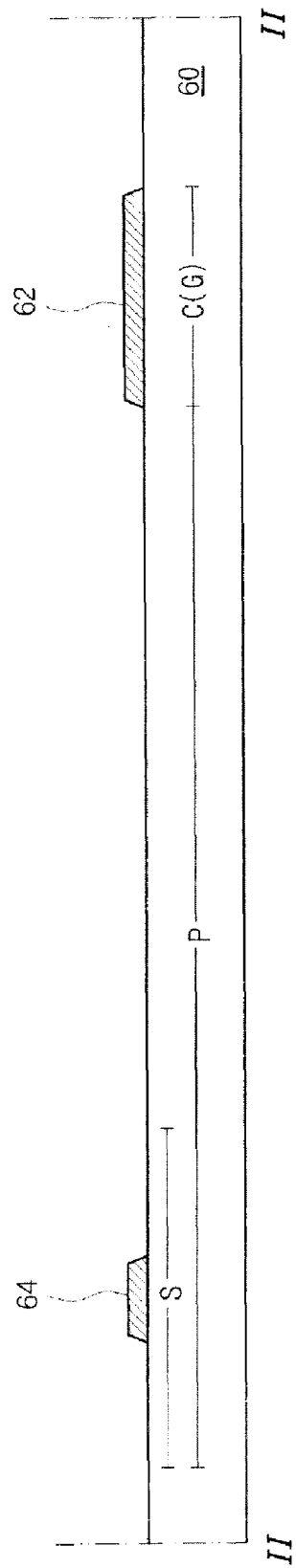
FIGS. 4A to 4G, FIGS. 5A to 5G and FIGS. 6A to 6G are cross-sectional views of an array substrate showing processes of manufacturing the same according to the related art.
Figure 4B:
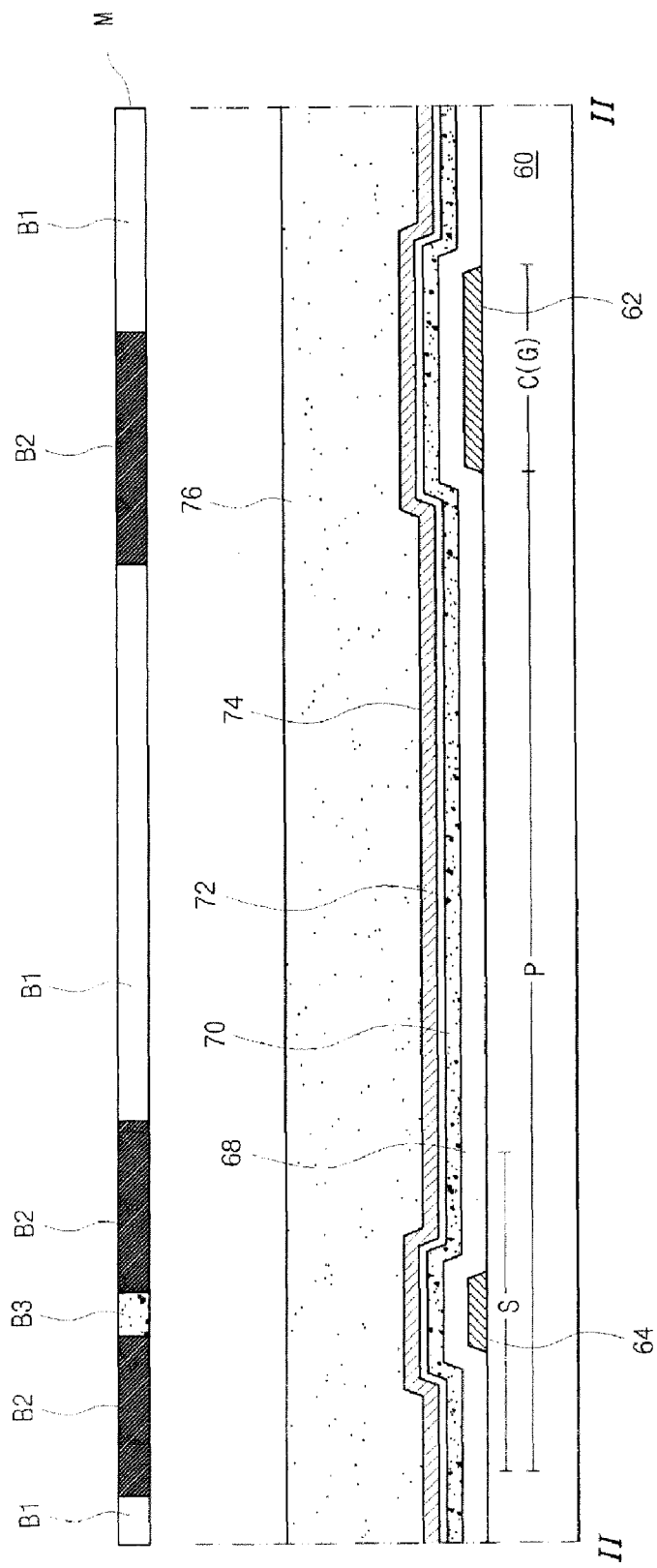
Figure 4C:
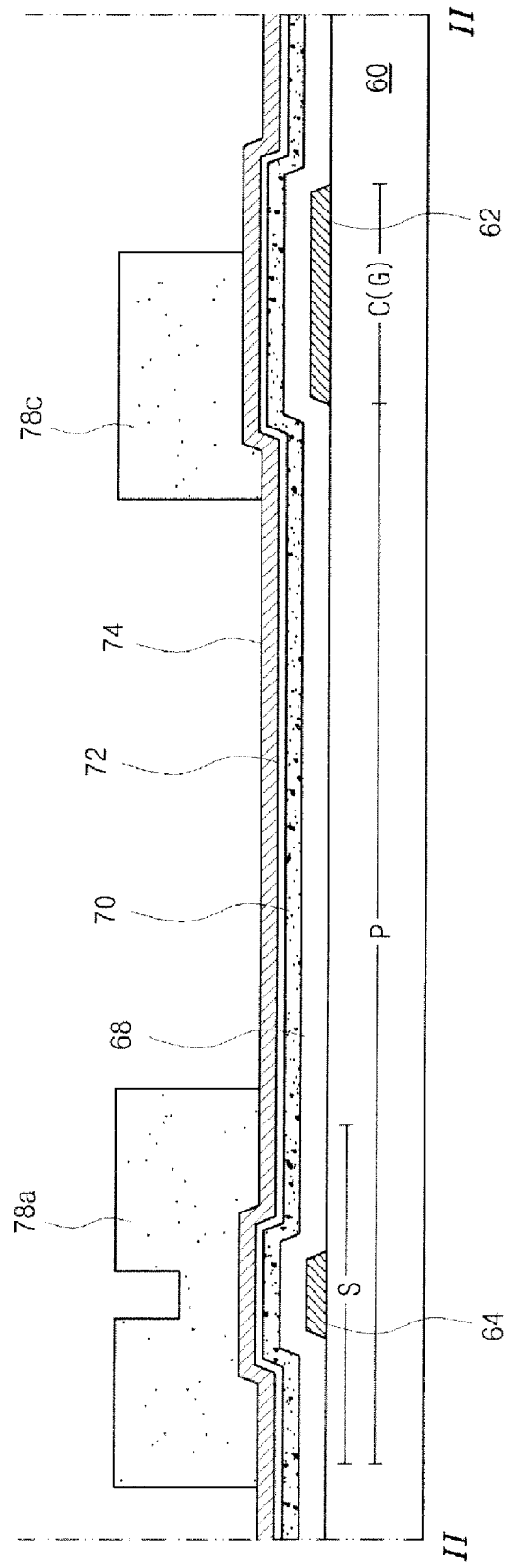
Figure 4D:
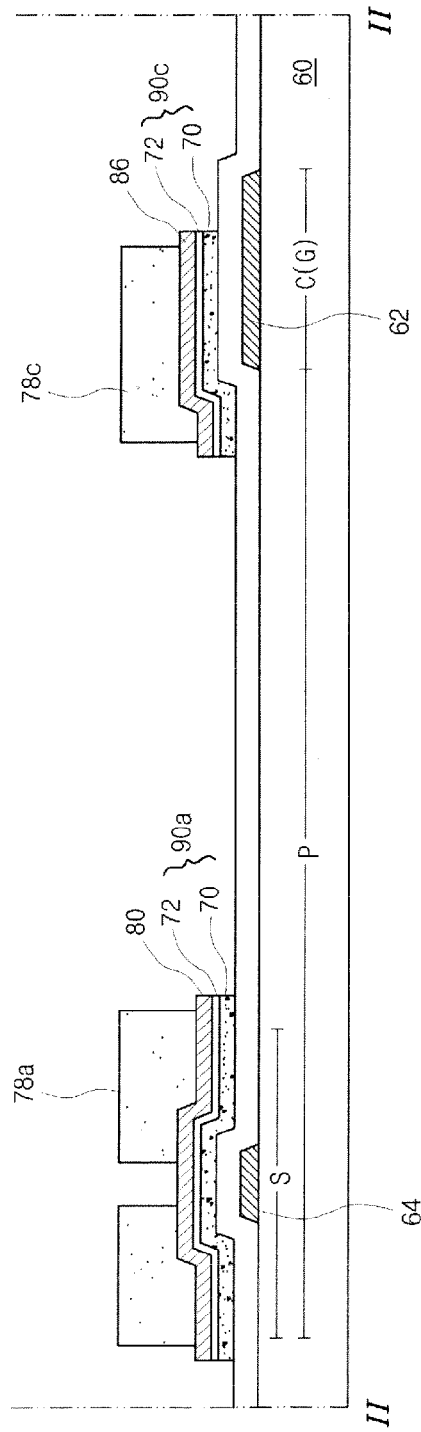
Figure 4E:
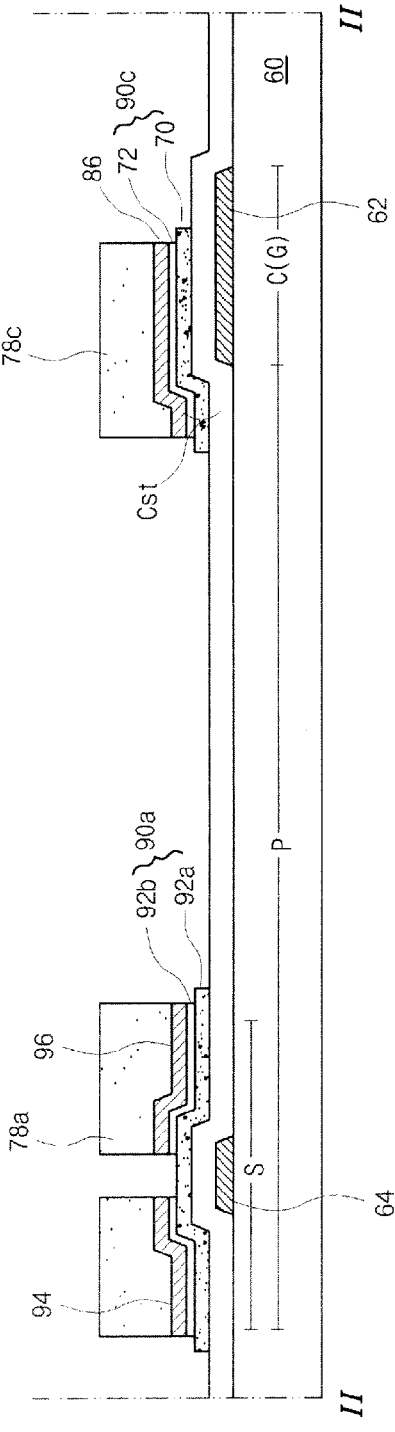
Figure 4F:
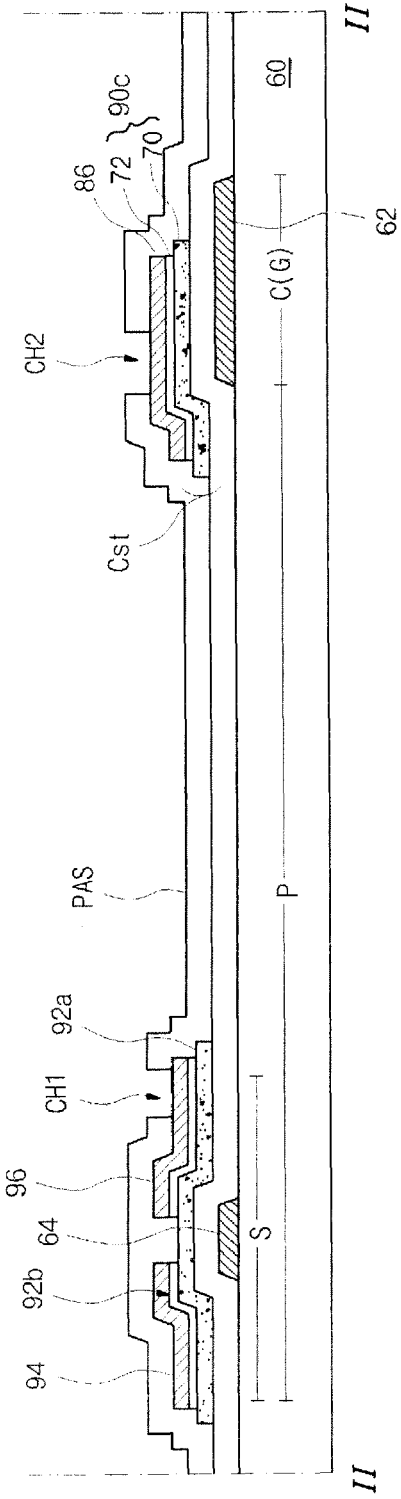
Figure 4G:
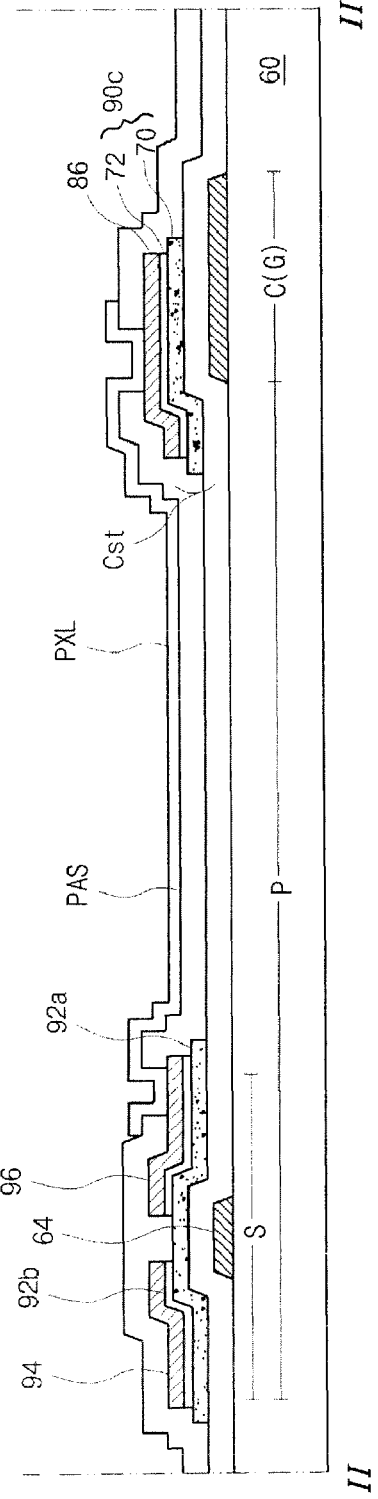
Figure 5A:
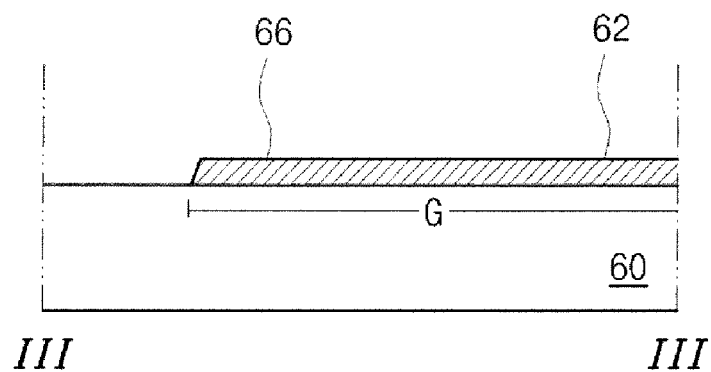
Figure 5B:
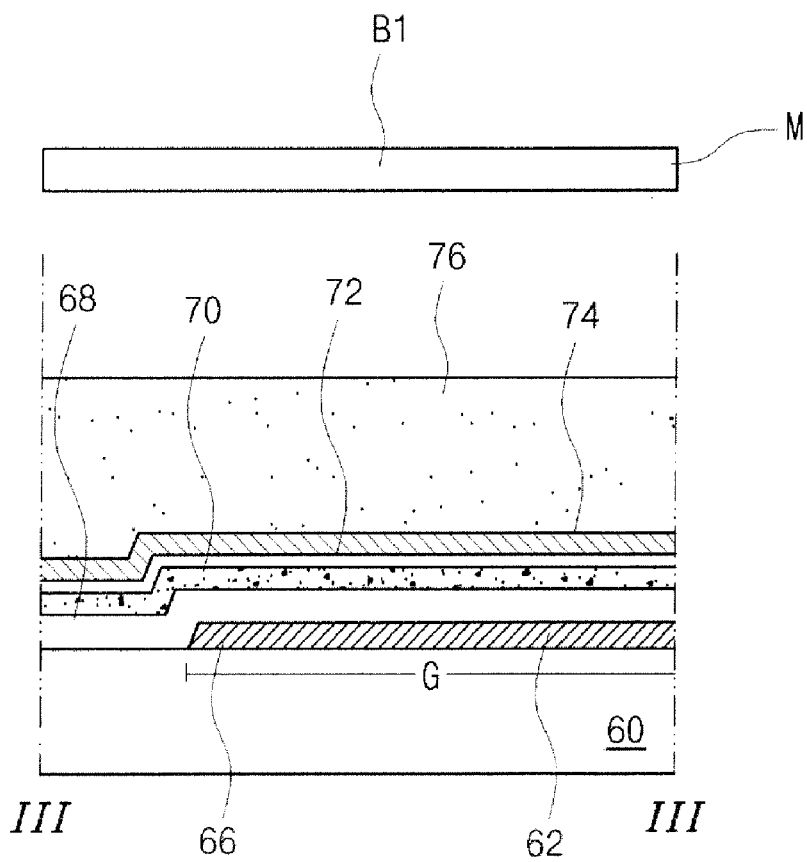
Figure 5C:
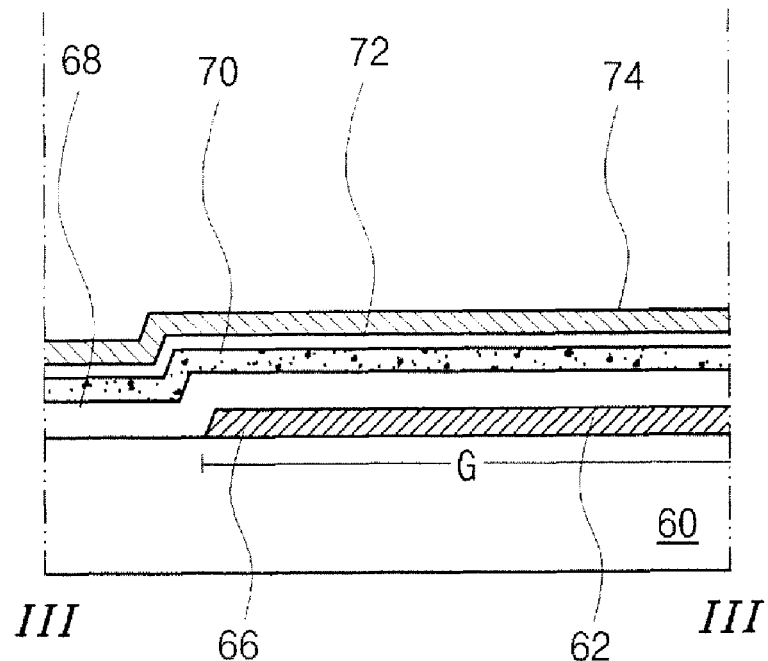
Figure 5D:
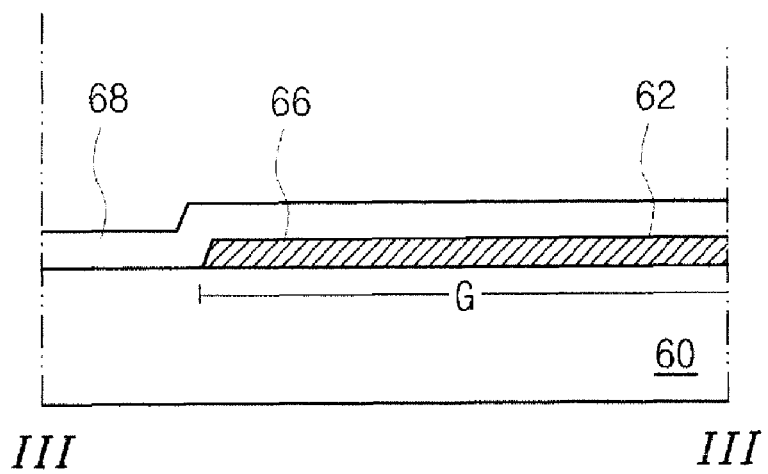
Figure 5E:
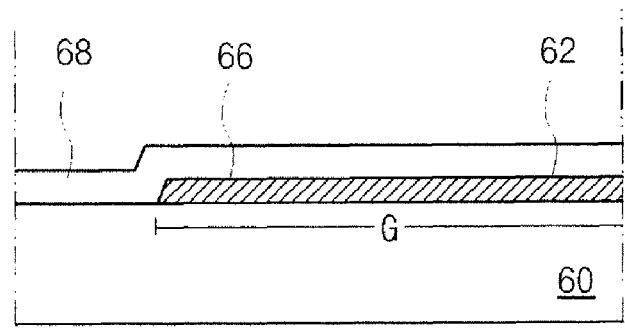
Figure 5F:
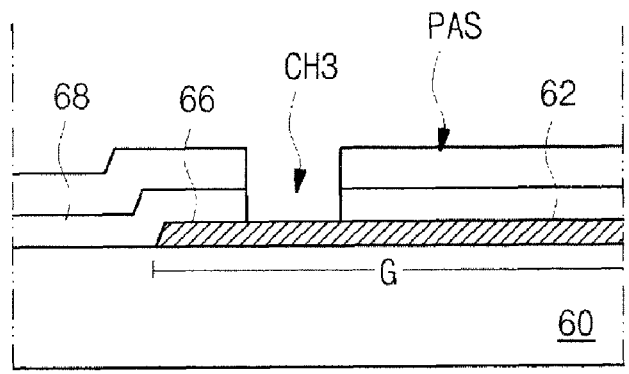
Figure 5G:
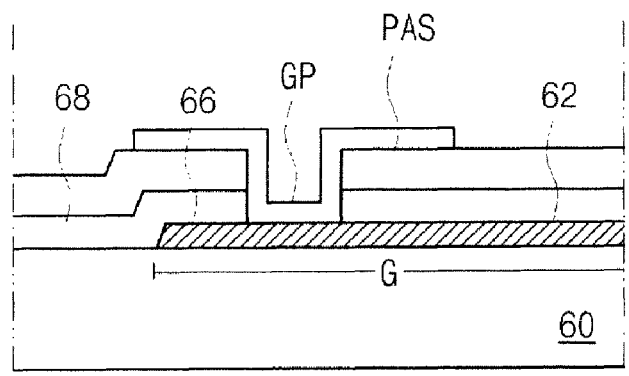
Figure 6A:
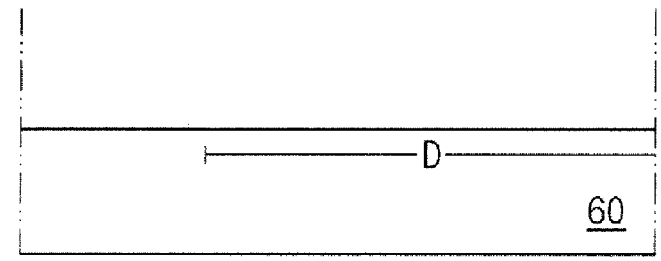
Figure 6B:
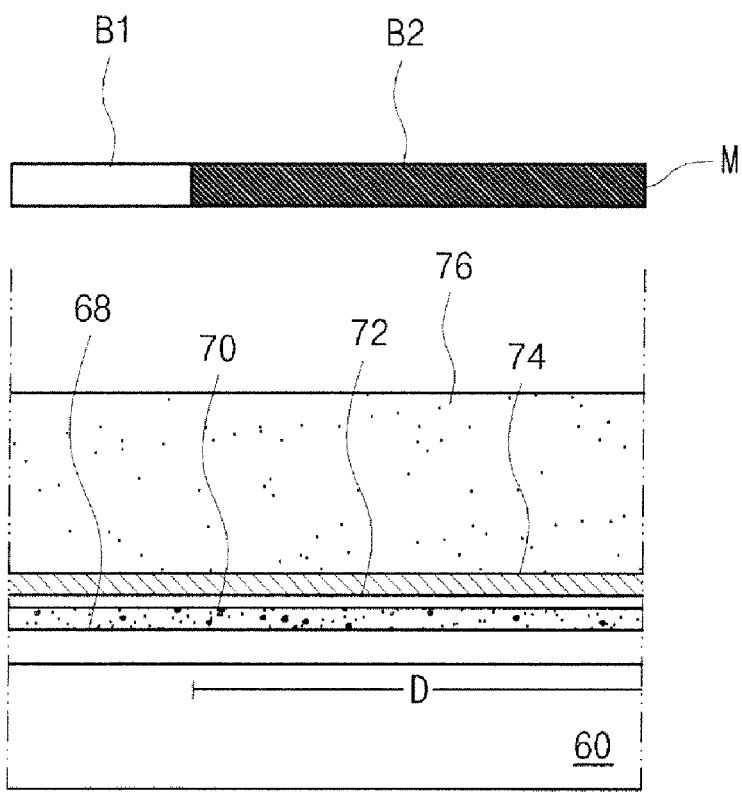
Figure 6C:
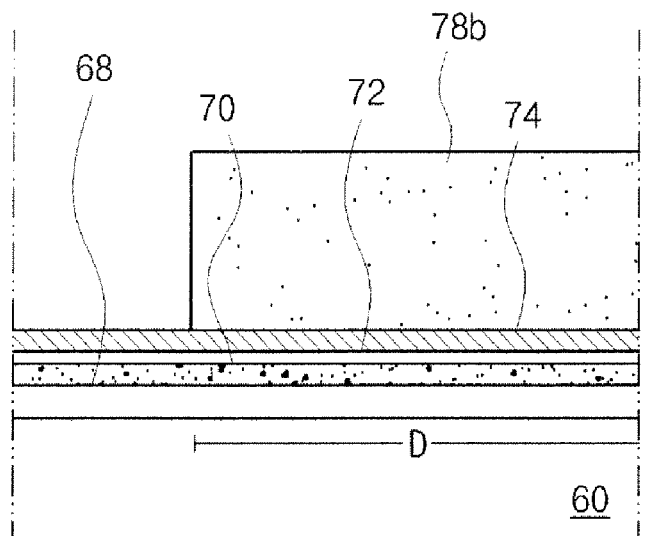
Figure 6D:
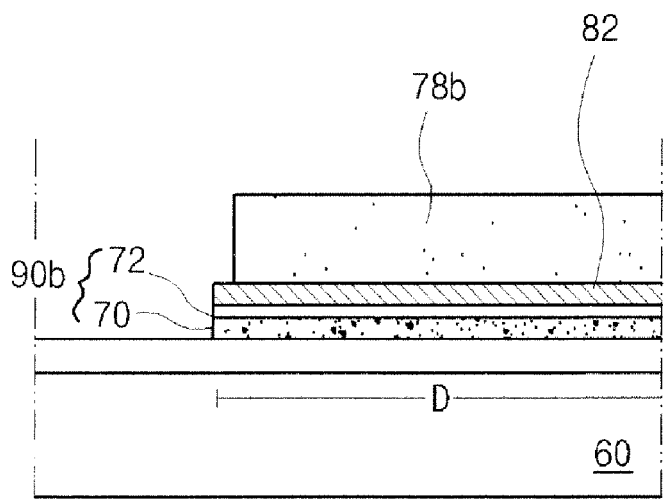
Figure 6E:
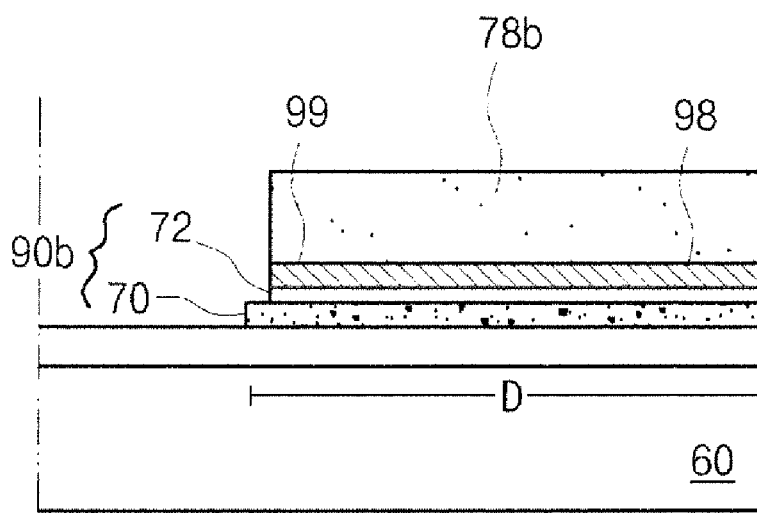
Figure 6F:
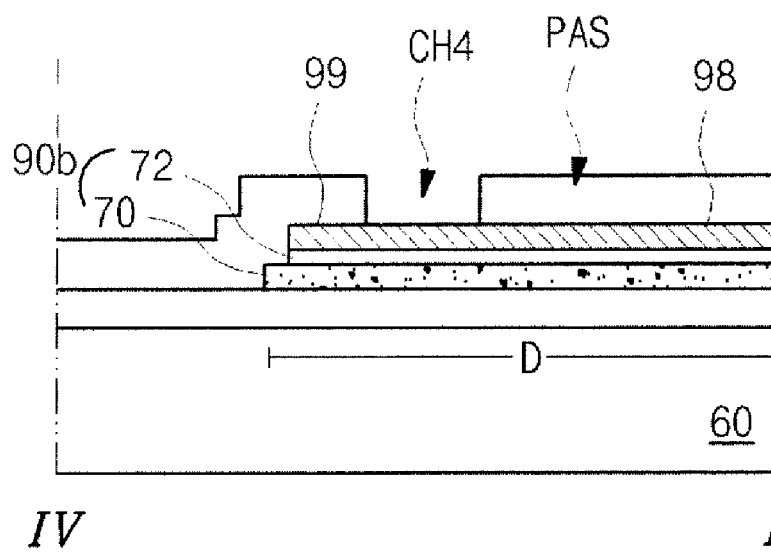
Figure 6G:
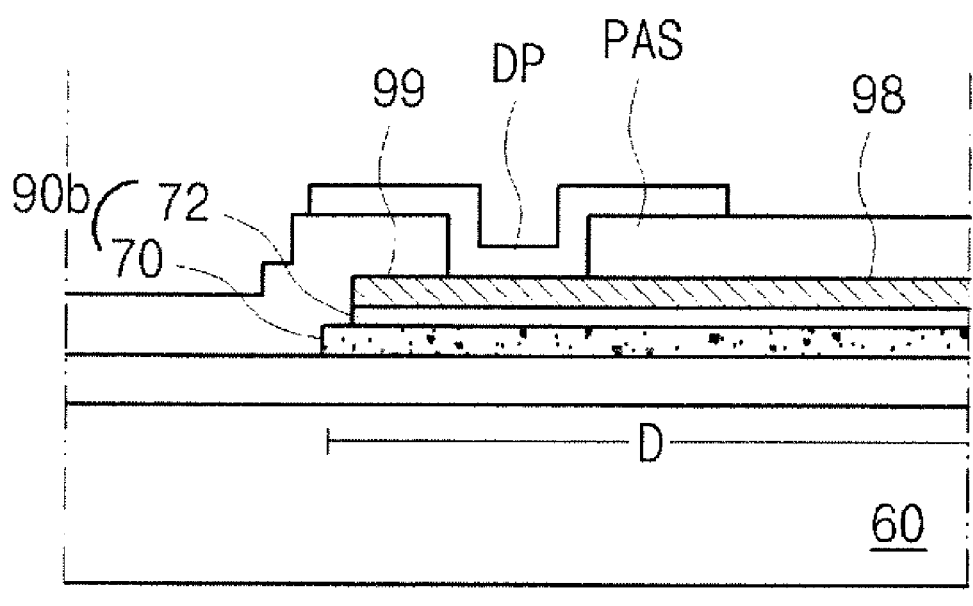
Figure 7:
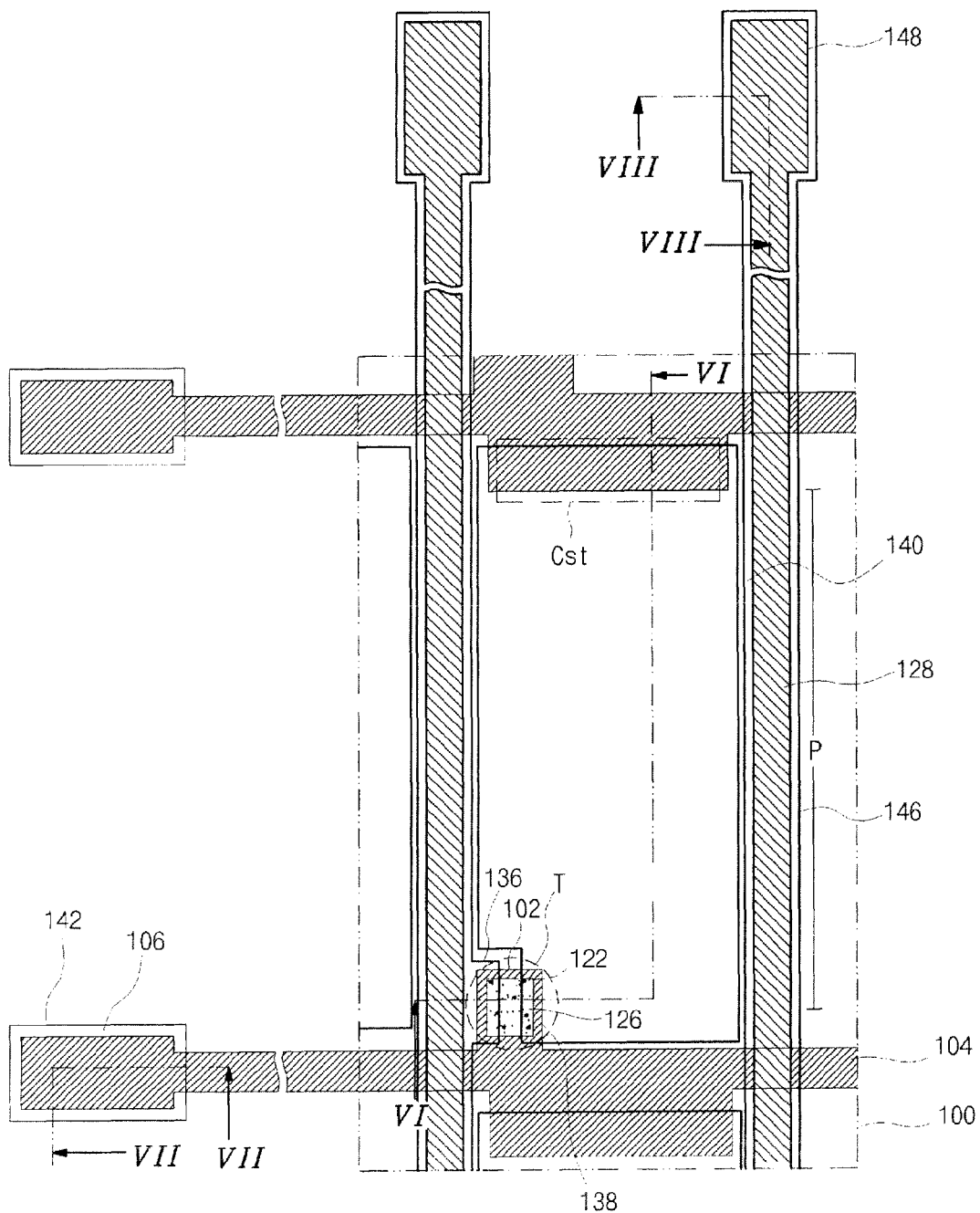
FIG. 7 is a plan view of an array substrate for an LCD device according to an exemplary embodiment of the present invention.

FIG. 7 is a plan view of an array substrate for a liquid crystal display (LCD) device according to an exemplary embodiment of the present invention. In FIG. 7, a gate line 104 is formed on an insulating substrate 100 along a first direction, and a data line 128 is formed along a second direction. The gate line 104 and the data line 128 cross each other to define a pixel region P. A gate pad 106 is formed at one end of the gate line 104, and a data pad 130 is formed at one end of the data line 128. A gate pad electrode 142 covers the gate pad 106. An auxiliary pattern 146 covers the data line 128, and a data pad electrode 148 covers the data pad 130. The gate pad electrode 142, the auxiliary pattern 146, and the data pad electrode 148 are formed of a transparent conductive material. The data pad electrode 148 is connected to the auxiliary pattern 146.

A thin film transistor T is formed at a crossing point of the gate line 104 and the data line 128. The thin film transistor T includes a gate electrode 102, an active layer 122, an ohmic contact layer (not shown), a buffer metallic layer 126, a source electrode 136, and a drain electrode 138. The buffer metallic layer 126 contacts the ohmic contact layer and the source and drain electrodes 136 and 138. The source electrode 136 and the drain electrodes 138 are formed of a transparent conductive material. The source electrode 136 is connected to the auxiliary pattern 146.

A pixel electrode 140 is formed in the pixel region P and is connected to the drain electrode 138. The pixel electrode 140 extends over the gate line 104. The pixel electrode 140 overlaps the gate line 104 to form a storage capacitor Cst, wherein the gate line 104 functions as a first electrode and the pixel electrode 140 functions as a second electrode.

Figure 8A:
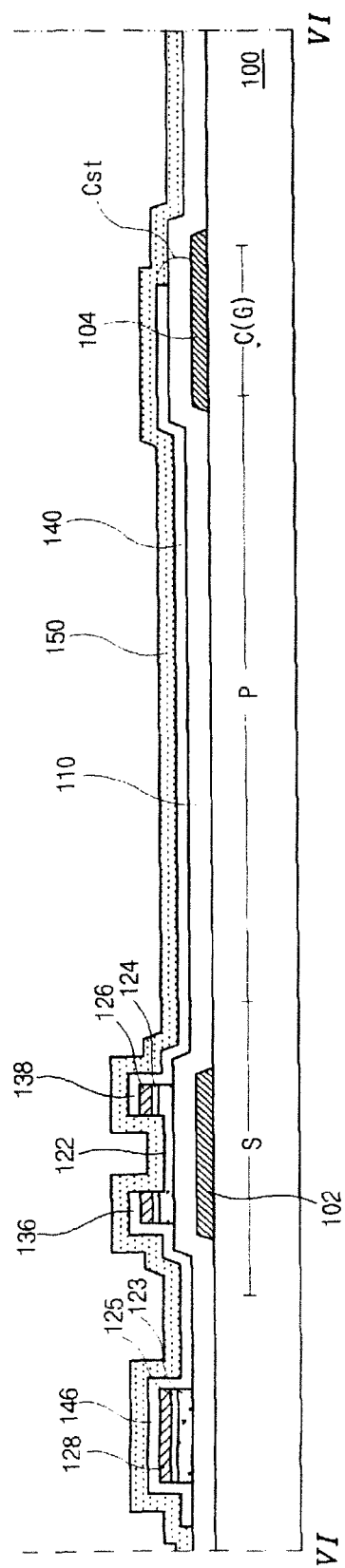
FIGS. 8A, 8B and 8C are cross-sectional views of an array substrate according to the exemplary embodiment of the present invention.
Figure 8B:
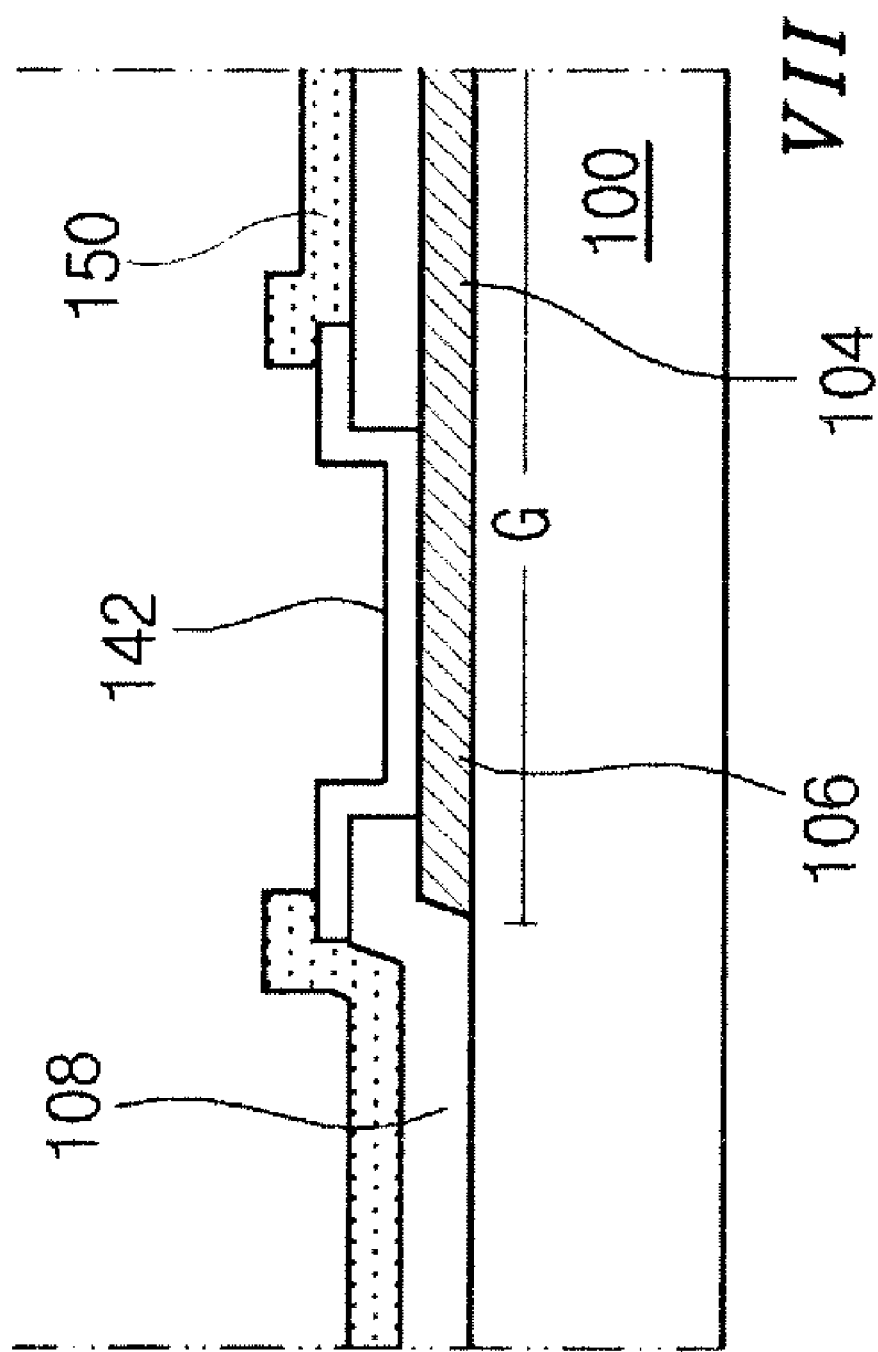
Figure 8C:
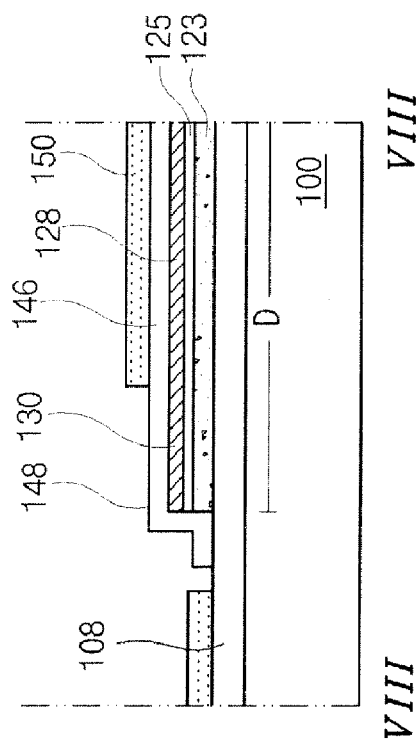

FIGS. 8A, 8B and 8C are cross-sectional views of an array substrate according to the exemplary embodiment of the present invention. FIGS. 8A, 8B and 8C correspond to cross-sectional view along the line VI-VI, the line VII-VII, and the line VIII-VIII of FIG. 7, respectively. FIG. 8A shows a switching region S and a pixel region P. FIG. 8B shows a gate region G including a gate line 104 and a gate pad 106. FIG. 8C shows a data region D including a data line 128 and a data pad 130.

In FIGS. 8A, 8B, and 8C, a pixel region P, a gate region G, a data region D, a storage region C, and a switching region S are defined on a substrate 100. The gate region G includes the storage region C. A thin film transistor T is formed in the switching region S on the substrate 100. The thin film transistor T includes a gate electrode 102, a first insulating layer 108, an active layer 122, an ohmic contact layer 124, a buffer metallic layer 126, and source and drain electrodes 136 and 138 that are sequentially formed. The source and drain electrodes 136 and 138 are formed of a transparent conductive material. The buffer metallic layer 126 decreases the contact resistance between the ohmic contact layer 124 and the source and drain electrodes 136 and 138.

As shown in FIG. 8B a gate line 104 and a gate pad 106 are formed in the gate region G on the substrate 100. The gate pad 106 is disposed at one end of the gate line 104. The first insulating layer 108 covers the gate line 104 and the gate pad 106. A gate pad electrode 142 is formed on the first insulating layer 108 and is connected to the gate pad 106. The gate pad electrode 142 is formed of a transparent conductive material.

As shown in FIG. 8C, a data line 128 and a data pad 130 are formed in the data region D on the first insulating layer 108. The data pad 130 is disposed at one end of the data line 128. An intrinsic amorphous silicon pattern 123 and an impurity-doped amorphous silicon pattern 125 are formed under each of the data line 128 and the data pad 130. An auxiliary pattern 146 covers the data line 128, the intrinsic amorphous silicon pattern 123, and the impurity-doped amorphous silicon pattern 125. The data pad electrode 148 covers the data pad 130, the intrinsic amorphous silicon pattern 123, and the impurity-doped amorphous silicon pattern 125. The auxiliary pattern 146 and the data pad electrode 148 are formed of a transparent conductive material. The auxiliary pattern 146 is connected to the source electrode 136 and the data pad electrode 148.

As shown in FIG. 8A, a pixel electrode 140 is formed in the pixel region P on the first insulating layer 108. The pixel electrode 140 overlaps with the gate line 104 to form a storage capacitor Cst in the storage region C. The pixel electrode 140 is formed of a transparent conductive material. The pixel electrode 140 is connected to the drain electrode 138.

A second insulating layer 150 is formed substantially on an entire surface of the substrate 100 including the source and drain electrodes 136 and 138, the pixel electrode 140, the gate pad electrode 142, the auxiliary pattern 146, and the data pad electrode 148. The second insulating layer 150 exposes the gate pad electrode 142 and the data pad electrode 148.

In the array substrate, the active layer 122 of intrinsic amorphous silicon and the ohmic contact layer 124 of impurity-doped amorphous silicon are formed over and within the gate electrode 102 and have an island shape. The intrinsic amorphous silicon pattern 123 and the impurity-doped amorphous silicon pattern 125 are not exposed beyond the data line 128. Accordingly, the wavy noise may be prevented, and the aperture ratio may be improved. In addition, the intrinsic amorphous silicon pattern 123 is separated from the active layer 122. The auxiliary pattern 146 covers the intrinsic amorphous silicon pattern 123 and the impurity-doped amorphous silicon pattern 125. The photo-leakage currents in the active layer 122 may be prevented.

Moreover, since the source and drain electrodes 136 and 138 are transparent, the source and drain electrodes 136 and 138 do not reflect light from a backlight at a rear side of the substrate 100. Thus, the light from the backlight is prevented from going on the active layer 122. Even though the data line 128 may be disconnected, signals may be transferred through the auxiliary pattern 146. The auxiliary pattern 146 functions as a repair line.

A method of manufacturing the array substrate through four mask processes will be explained hereinafter with reference to attached drawings. FIGS. 9A to 9I, FIGS. 10A to 10I, and FIGS. 11A to 11I illustrate an array substrate showing processes of manufacturing the same according to the exemplary embodiment of the present invention. FIGS. 9A to 9I are cross-sectional views along the line VI-VI of FIG. 7 and show a thin film transistor and a pixel electrode. FIGS. 10A to 10I are cross-sectional views along the line VII-VII of FIG. 7 and show a gate pad and a gate line. FIGS. 11A to 11I are cross-sectional views along the line VIII-VIII of FIG. 7 and show a data pad and a data line.

Figure 9A:
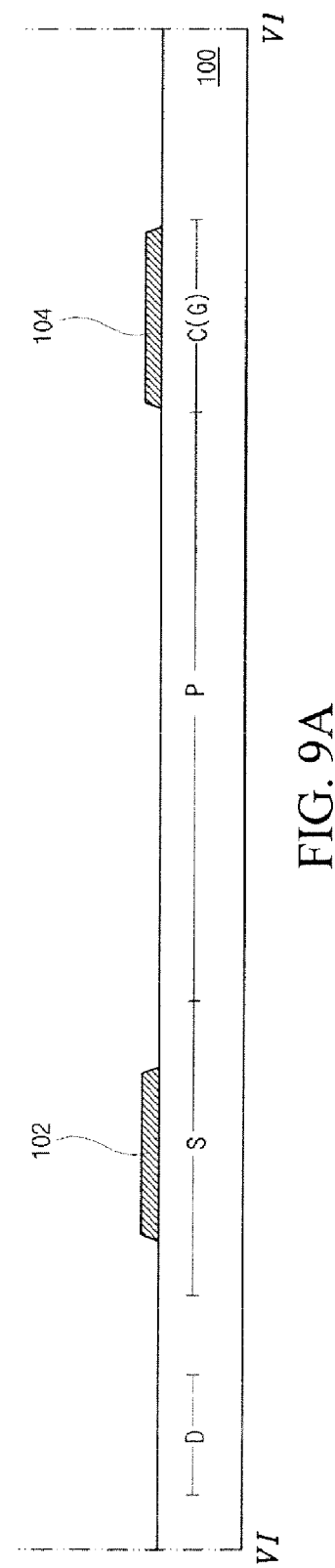
Figure 10A:
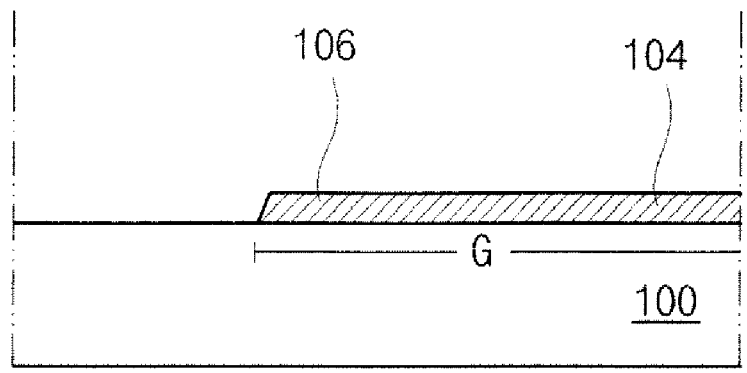
Figure 11A:
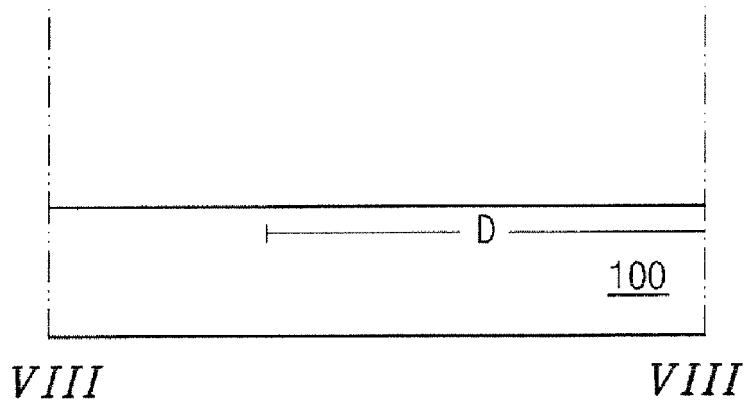

FIG. 9A, FIG. 10A and FIG. 11A show the array substrate in a first mask process. In FIG. 9A, FIG. 10A and FIG. 11A, a switching region S, a pixel region P, a gate region G, a data region D, and a storage region C are defined on a substrate 100. The gate region G includes the storage region C.

A first conductive metallic layer (not shown) is formed on the substrate 100, where the regions S, P, G, D and C are defined, by depositing a conductive metal consisting of one or more material from a conductive metallic group including aluminum (Al), aluminum alloy (AlNd), chromium (Cr), molybdenum (Mo), tungsten (W), titanium (Ti), copper (Cu), and tantalum (Ta). The first conductive metallic layer is patterned through a first mask process to form a gate electrode 102, a gate line 104, and a gate pad 106. The gate electrode 102 is disposed in the switching region S, and the gate line 104 and the gate pad 106 are disposed in the gate region G. The gate pad 106 is formed at one end of the gate line 104.

Figure 10B:
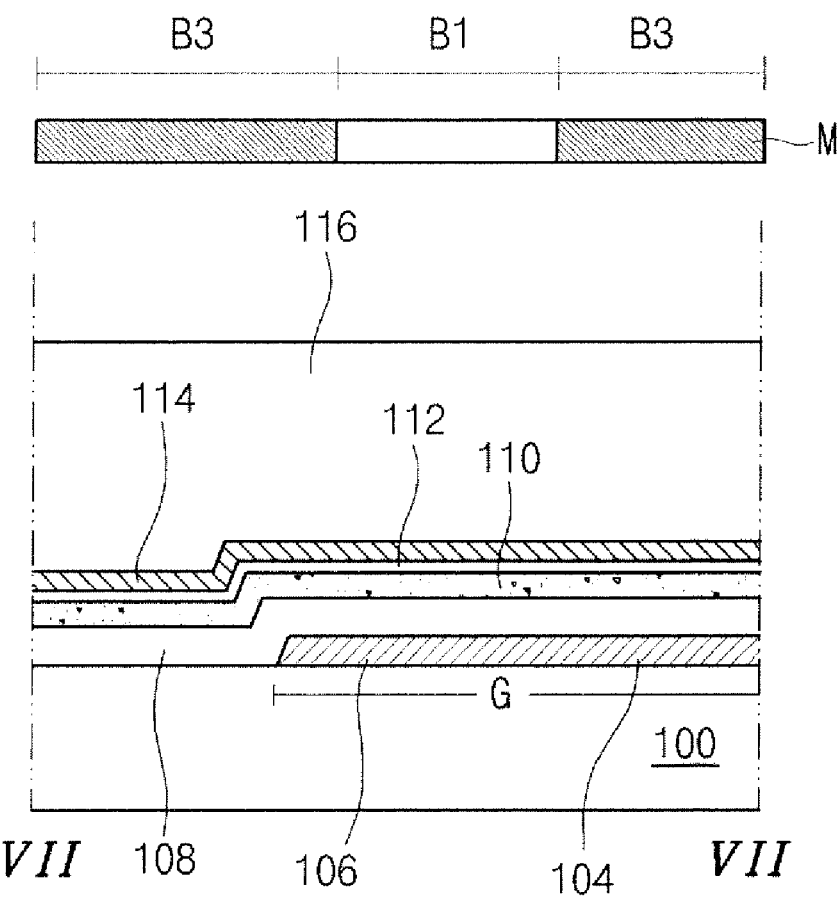
Figure 10C:
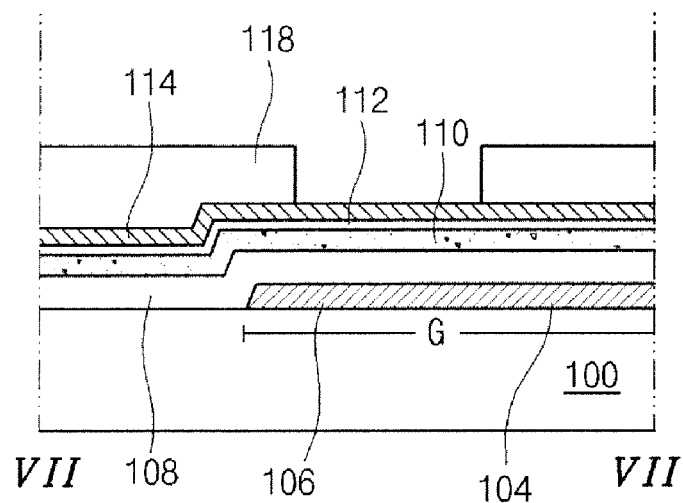
Figure 10D:
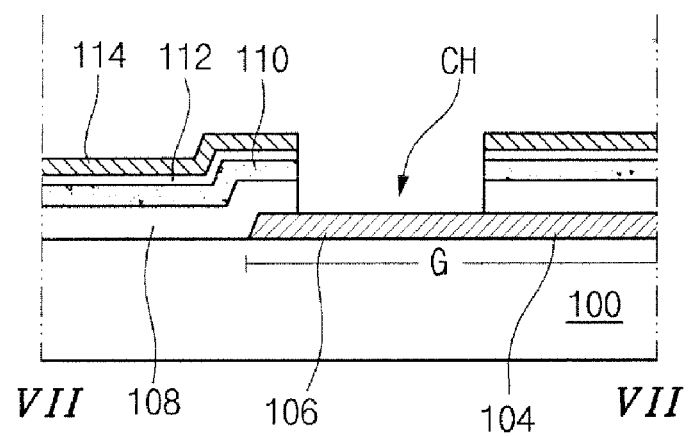
Figure 10E:
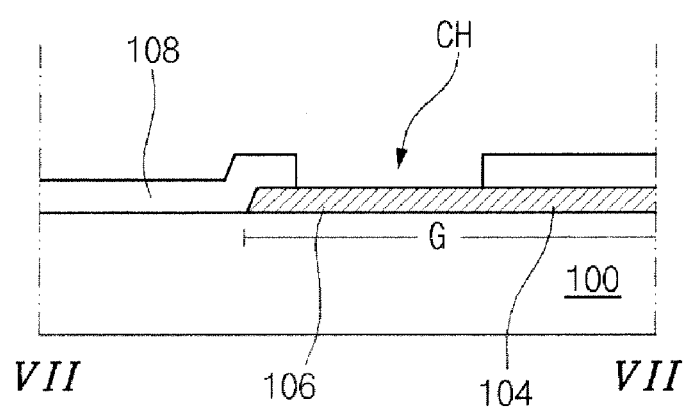
Figure 11B:
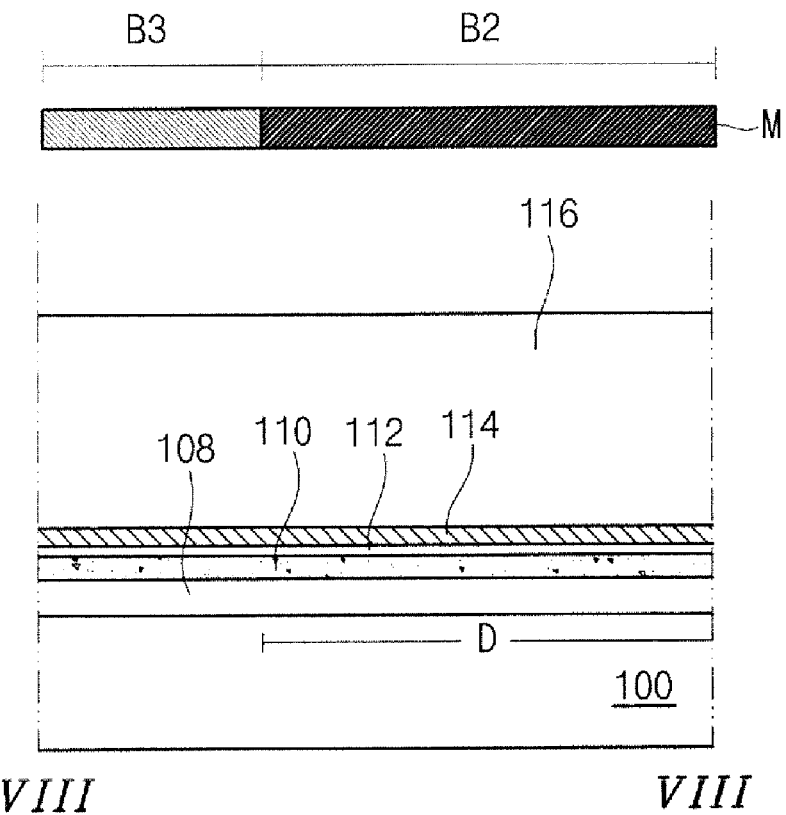

FIGS. 9B to 9E, FIGS. 10B to 10E, and FIGS. 11B to 11E show the array substrate in a second mask process. In FIG. 9B, FIG. 10B and FIG. 11B, a first insulating layer 108, an intrinsic amorphous silicon layer (a-Si:H) 110, an impurity-doped amorphous silicon layer (for example, n+a-Si:H) 112, and a second conductive metallic layer 114 are sequentially formed substantially on an entire surface of the substrate 100 including the gate electrode 102, the gate line 104 and the gate pad 106. A photoresist layer 116 is formed on the second conductive metallic layer 114 by coating the substrate 100 with photoresist.

The first insulating layer 108 may be formed by depositing an inorganic insulating material consisting of one or more materials from an inorganic insulating material group including silicon nitride (SiNX) and silicon oxide (SiO2). The second conductive metallic layer 114 may be formed of a conductive metal consisting of one or more materials from a conductive metallic group including aluminum (Al), aluminum alloy (AlNd), chromium (Cr), molybdenum (Mo), tungsten (W), titanium (Ti), copper (Cu), and tantalum (Ta). The second conductive metallic layer 114 may be formed of a metallic material that can be dry-etched, for example, molybdenum (Mo)

A mask M is disposed over the photoresist layer 116. The mask M includes a light-transmitting portion B1, a light-blocking portion B2, and a light-half transmitting portion B3. The light-blocking portion B2 corresponds to the switching region S and the data region D. The light-transmitting portion B1 corresponds to the gate region G for the gate pad 106. The light-half transmitting portion B3 corresponds to other regions. The size of the light-blocking portion B2 corresponding to the switching region S is not larger than the gate electrode 102. Next, the photoresist layer 116 is exposed to light through the mask M and then is developed.

Figure 11C:
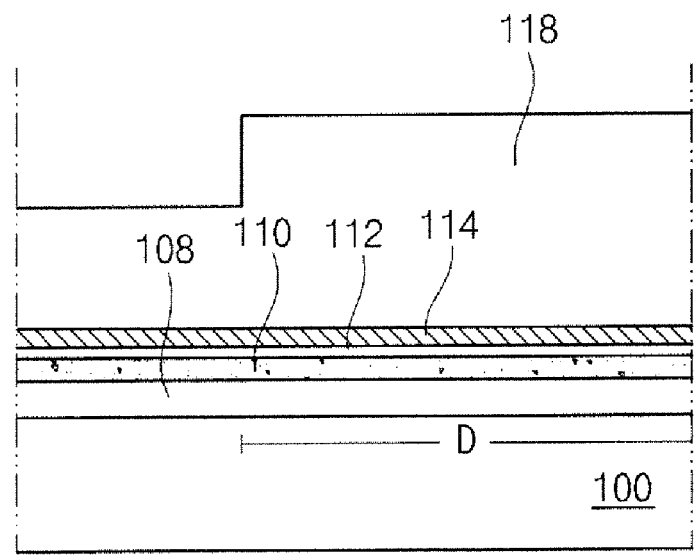

In FIG. 9C, FIG. 10C, and FIG. 11C, a photoresist pattern 118 is formed after developing the photoresist layer 116 of FIG. 9B, FIG. 10B, and FIG. 11B. The photoresist pattern 118 has a first part of a first thickness and a second part of a second thickness. The first part is disposed in the switching region S and the data region D. The second part is disposed in other regions except the switching region S, the data region D, and the gate region G for the gate pad 106. The photoresist pattern 118 is removed in the gate region G for the gate pad 106 to expose the second conductive metallic layer 114. The first thickness is substantially the same as the original thickness of the photoresist layer 116 of FIG. 9B, FIG. 10B and FIG. 11B. The second thickness is thinner than the first thickness. The exposed second conductive metallic layer 114, the impurity-doped amorphous silicon layer 112, the intrinsic amorphous silicon layer 110, and the first insulating layer 108 are removed in the gate region G for the gate pad 106.

Figure 11D:
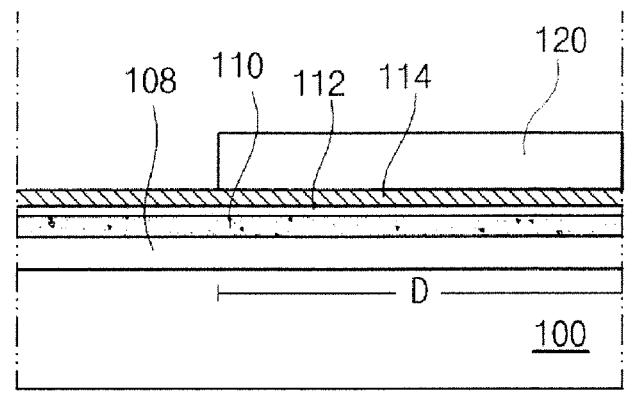

In FIG. 9D, FIG. 10D and FIG. 11D, a gate pad contact hole CH is formed. The gate pad contact hole CH exposes the gate pad 106. Next, an ashing process is performed to remove the second part of the photoresist pattern 118. The first part of the photoresist pattern 118 of FIG. 9C is also partially removed. A photoresist pattern 120 remains in the switching region S and the data region D. The photoresist pattern 120 has a thinner thickness than the first part of the photoresist pattern 118 of FIG. 9C. The second conductive metallic layer 114 is exposed in the other regions except the switching region S, the data region D, and the gate region G for the gate pad 106. The second conductive metallic layer 114, the impurity-doped amorphous silicon layer 112, and the intrinsic amorphous silicon layer 110 are removed by using the photoresist pattern 120 as an etching mask.

Figure 11E:
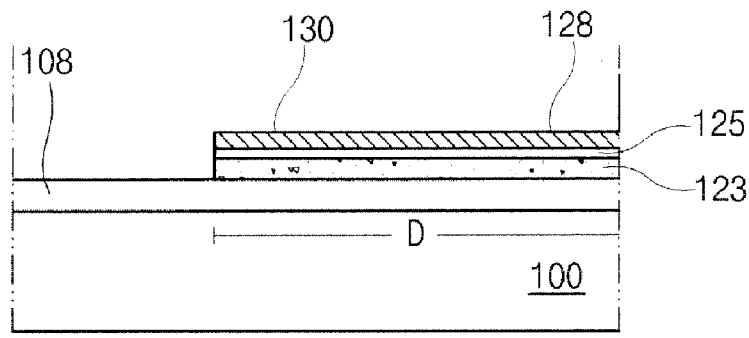

In FIG. 9E, FIG. 10E and FIG. 11E, an active layer 122, an ohmic contact layer 124, and a buffer metallic layer 126 are sequentially formed in the switching region S. A data line 128 and a data pad 130 are formed in the data region D. The data pad 130 is disposed at one end of the data line 128. The data line 128 and the data pad 130 are separated from the buffer metallic layer 126, the ohmic contact layer 124, and the active layer 122. An intrinsic amorphous silicon pattern 123 and an impurity-doped amorphous silicon pattern 125 are formed under each of the data line 128 and the data pad 130. The intrinsic amorphous silicon pattern 123 is not exposed beyond the data line 128. The first insulating layer 108 is disposed in the other regions except the gate region G for the gate pad 106. In the gate region G, the gate pad 106 is exposed through the gate pad contact hole CH.

Figure 9H:
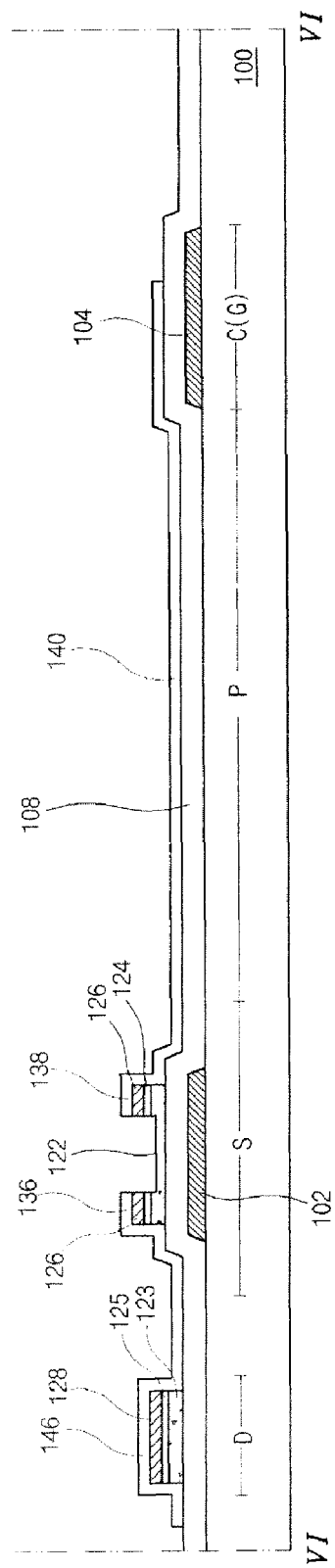
Figure 10F:
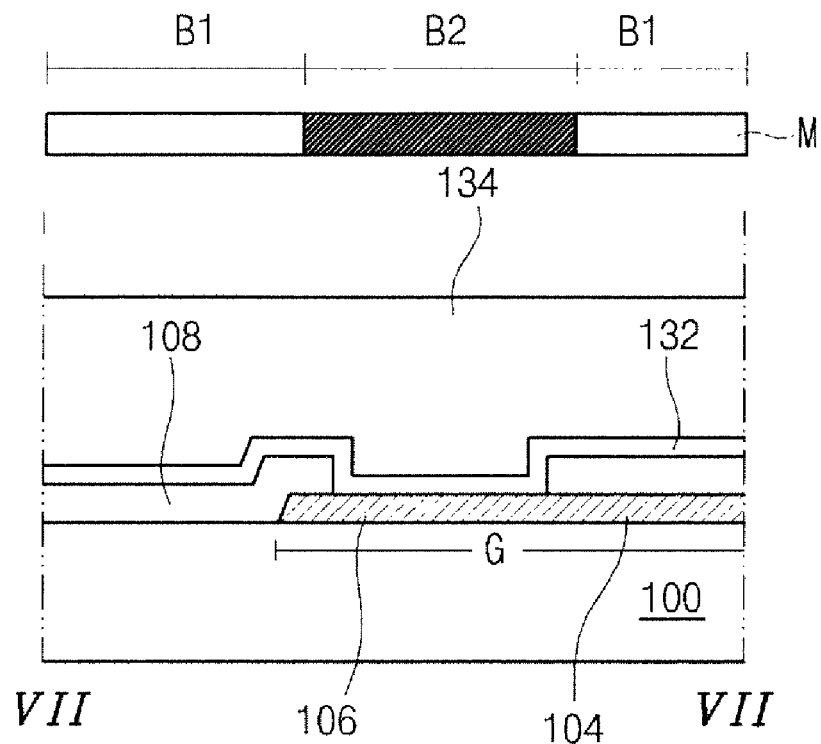
Figure 10G:
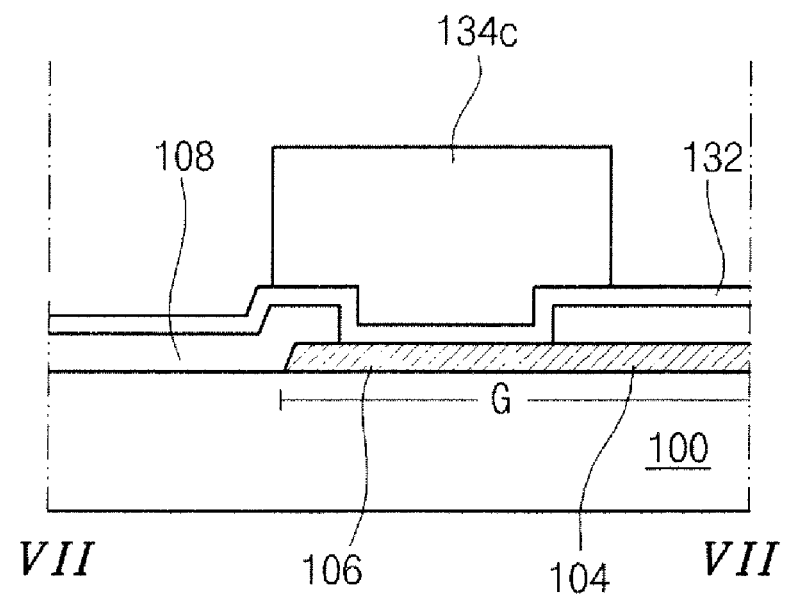
Figure 10H:
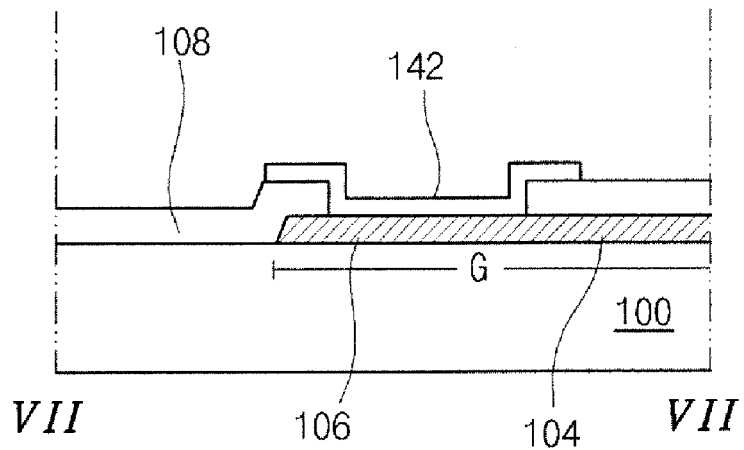
Figure 11F:
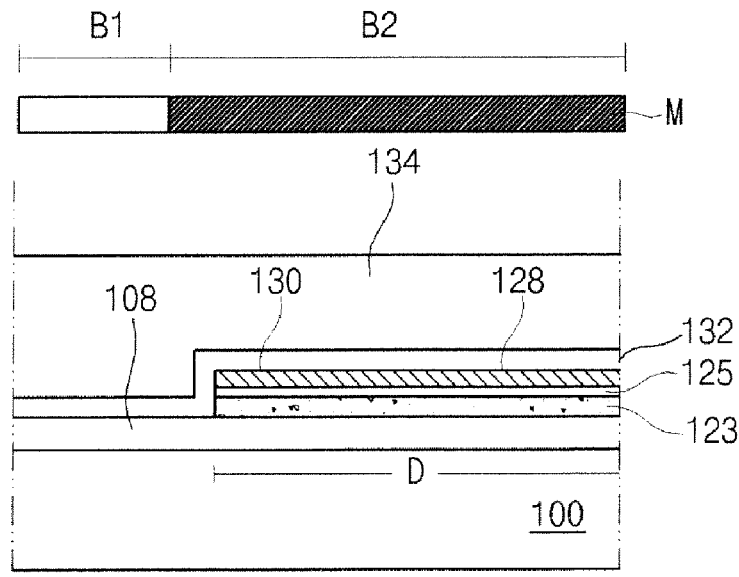

FIGS. 9F to 9H, FIGS. 10F to 10H, and FIGS. 11F to 11H show the array substrate in a third mask process. In FIG. 9F, FIG. 10F and FIG. 11F, a transparent conductive layer 132 is formed substantially on an entire surface of the substrate 100. A photoresist layer 134 is formed on the transparent conductive layer 132 by coating the substrate 100 with photoresist. The transparent conductive layer 132 is formed of a conductive material selected from a transparent conductive material group including indium tin oxide, indium tin zinc oxide and indium zinc oxide.

A mask M is disposed over the photoresist layer 134. The mask M includes a light-transmitting portion B1 and a light-blocking portion B2. The light-blocking portion B2 corresponds to the pixel region P, both sides of the switching region S, the gate region G for the gate pad 106, and the data region D. The light-transmitting portion B1 corresponds to the center of the switching region C between both sides of the switching region S and other regions. One part of the blocking portion B2 corresponding to the switching region S is connected to the blocking portion B2 corresponding to the data region D. The other part of the blocking portion B2 corresponding to the switching region S is connected to the blocking portion B2 corresponding to the pixel region P. The photoresist layer 134 is exposed to light through the mask M and then is developed.

Figure 11G:
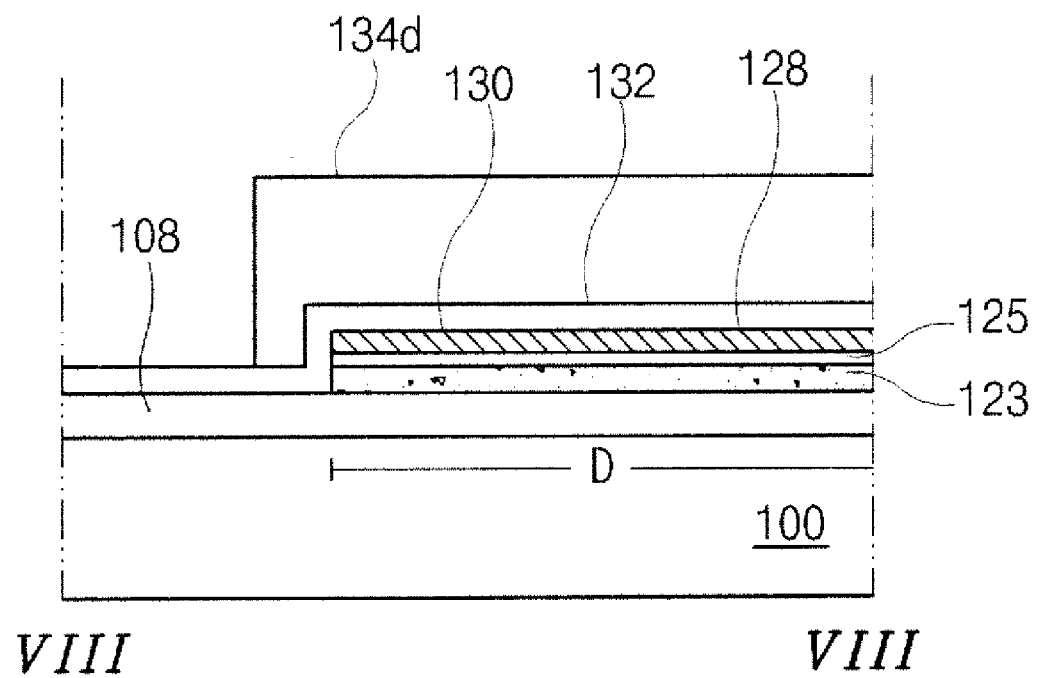

In FIG. 9G, FIG. 10G, and FIG. 11G, first, second, third, and fourth photoresist patterns 134a, 134b, 134c, and 134d are formed. The first photoresist pattern 134a is disposed in the switching region S. The first photoresist pattern 134a includes two parts spaced apart from each other. The second photoresist pattern 134b is disposed in the pixel region P, and the third photoresist pattern 134c is disposed in the gate region G for the gate pad 106. The fourth photoresist pattern 134d is disposed in the data region D. One part of the first photoresist pattern 134a is connected to the fourth photoresist pattern 134d, and the other part of the first photoresist pattern 134a is connected to the second photoresist pattern 134b. The transparent conductive layer 132 is removed by using the first, second, third, and fourth photoresist patterns 134a, 134b, 134c, and 134d as an etching mask. Thereafter, the first, second, third, and fourth photoresist patterns 134a, 134b, 134c, and 134d are removed.

Figure 11H:
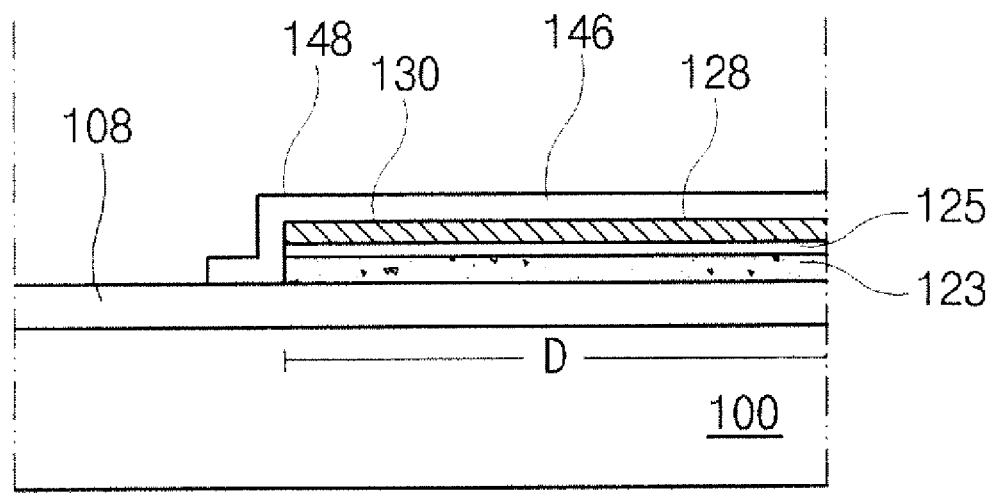

In FIG. 9H, FIG. 10H and FIG. 11H, a source electrode 136, a drain electrode 138, a pixel electrode 140, a gate pad electrode 142, a data pad electrode 148, and an auxiliary pattern 146 are formed. The source electrode 136 and the drain electrode 138 are formed in the switching region S. The pixel electrode 140 is formed in the pixel region P. The pixel electrode 140 extends from the drain electrode 138. The gate pad electrode 142 is formed in the gate region G and contacts the gate pad 106. The data pad electrode 148 and the auxiliary pattern 146 are formed in the data region D. The auxiliary pattern 146 is connected to the source electrode 136 and the data pad electrode 148. The auxiliary pattern 146 covers the data line 128. The data pad electrode 148 covers the data pad 130.

The buffer metallic layer 126 is exposed between the source and drain electrodes 136 and 138. The exposed buffer metallic layer 126 and the ohmic contact layer 124, between the source and drain electrodes 136 and 138, are removed. In the switching region S, the active layer 122 is exposed between the source and drain electrodes 136 and 138.

Figure 9I:
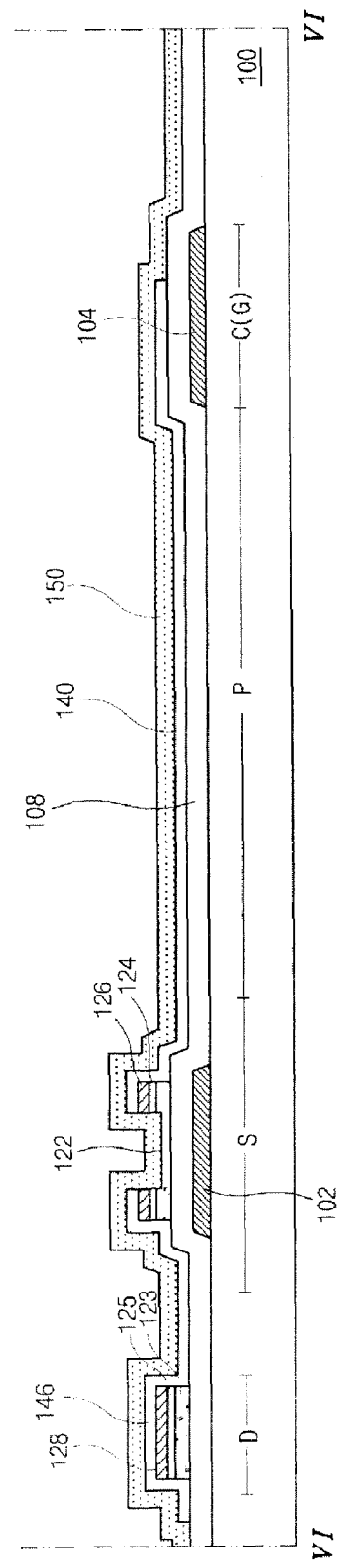
Figure 10I:
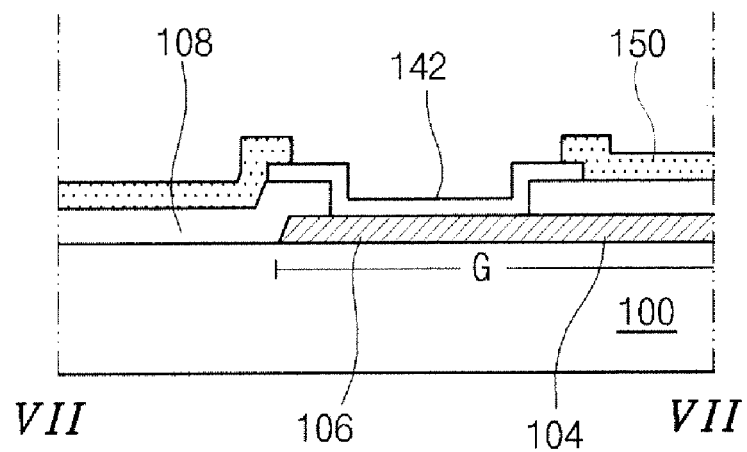
Figure 11I:
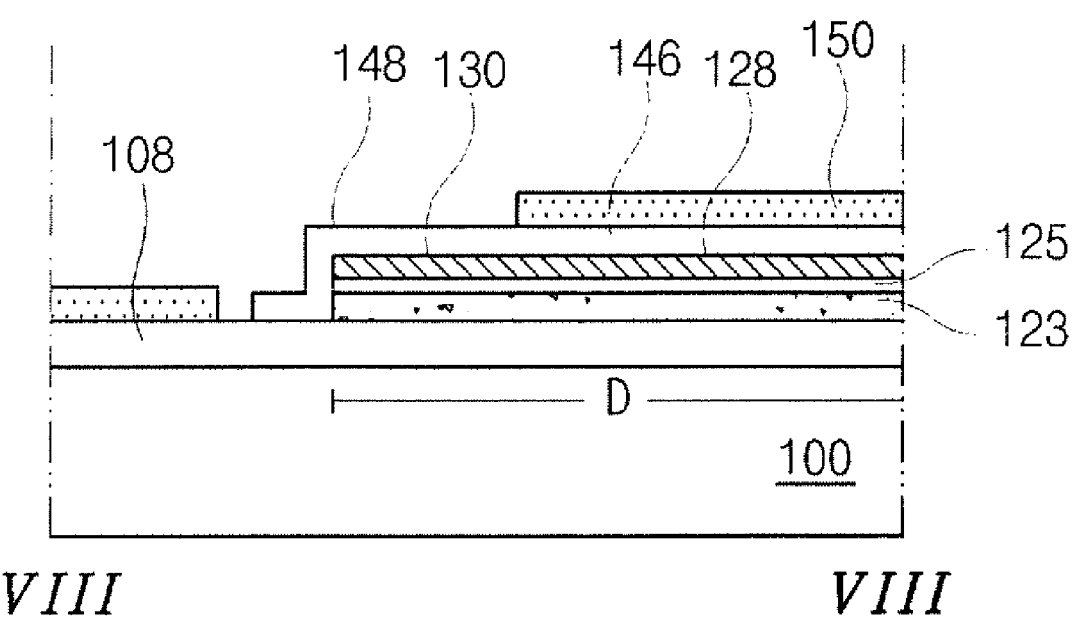

FIG. 9I, FIG. 10I, and FIG. 11I show the array substrate in a fourth mask process. In FIG. 9I, FIG. 10I and FIG. 11I, a second insulating layer 150 is formed substantially on an entire surface of the substrate 100 by depositing an inorganic insulating material consisting of one or more materials from an inorganic insulating material group including silicon nitride (SiNX) and silicon oxide (SiO2). The second insulating layer 150 is patterned through a fourth mask process, and the gate pad electrode 142 and the data pad electrode 148 are exposed. Here, the second insulating layer 150 may be removed in the pixel region P to thereby expose the pixel electrode 140.

The pixel electrode 140 overlaps with the gate line 104 to form a storage capacitor with the first insulating layer 108 interposed therebetween, wherein the gate line 104 functions as a first electrode and the pixel electrode 140 functions as a second electrode.

Like this, the array substrate for an LCD device may be manufactured through four mask processes. The gate electrode, the gate line and the gate pad are formed through the first mask process. The first insulating layer, the active layer, the ohmic contact layer, the buffer metallic layer, the data line and the data pad are formed through the second mask process, wherein the gate pad is exposed by removing a second conductive metallic layer for the buffer metallic layer, an impurity-doped amorphous silicon layer for the ohmic contact layer, an intrinsic amorphous silicon layer for the active layer, and the first insulating layer. The source and drain electrodes, the pixel electrode, the gate pad electrode, the auxiliary pattern, and the data pad electrode are formed through the third mask process. In the fourth mask process, the second insulating layer is formed, and the gate pad electrode and the data pad electrode are exposed by removing the second insulating layer.

In the present invention, the active layer is disposed over and within the gate electrode, and light from the backlight is prevented from going into the active layer. Accordingly, a photo-leakage current is not generated, and the thin film transistor operates properly. High quality images can be displayed. In addition, since the intrinsic amorphous silicon layer is not exposed beyond the data line, the wavy noise does not occur. The aperture ratio increases, and the brightness of the device is improved. Furthermore, the auxiliary pattern of a transparent conductive material covers the data line. Even though the data line may be disconnected, signals can be provided through the auxiliary pattern. This increases production yields of the device.

It will be apparent to those skilled in the art that various modifications and variations can be made in the array substrate for liquid crystal display device and method of manufacturing the same of the present invention without departing from the spirit or scope of the invention. Thus, it is intended that the present invention cover the modifications and variations of this invention provided they come within the scope of the appended claims and their equivalents.

What is claimed is:

1. A method of manufacturing an array substrate for a liquid crystal display device, comprising:
   forming a gate electrode and a gate line on a substrate through a first mask process;
   forming a first insulating layer, an active layer, an ohmic contact layer, a buffer metallic layer, and a data line on the substrate including the gate electrode and the gate line through a second mask process; and
   forming a source electrode, a drain electrode, and a pixel electrode through a third mask process, the pixel electrode extending from the drain electrode,
   wherein the active layer is disposed over and within the gate electrode.

2. The method according to claim 1, wherein the first mask process further includes forming a gate pad at one end of the gate line, the second mask process further includes forming a data pad at one end of the data line, and the third mask process further includes forming a gate pad electrode on the gate pad and forming a data pad electrode on the data pad.

3. The method according to claim 2, further comprising a second insulating layer covering the source and drain electrodes and the pixel electrode through a fourth mask process, wherein the second insulating layer exposes the gate pad electrode and the data pad electrode.

4. The method according to claim 2, wherein the second mask process includes:
   forming the first insulating layer, an intrinsic amorphous silicon layer, an impurity-doped amorphous silicon layer, a conductive metallic layer, and a photoresist layer substantially on an entire surface of the substrate including the gate electrode, the gate line and the gate pad;
   disposing a mask over the photoresist layer;
   exposing the photoresist layer to light through the mask;
   forming a photoresist pattern by developing the photoresist layer exposed to light, the photoresist pattern exposing the conductive metallic layer corresponding to the gate pad, the photoresist pattern including a first part corresponding to the active layer, the data line and the data pad and a second part corresponding to other areas except the gate pad, the active layer, the data line and the data pad, the first part being thicker than the second part;

exposing the gate pad by removing the exposed conductive metallic layer, the impurity-doped amorphous silicon layer, the intrinsic amorphous silicon layer and the first insulating layer;

removing the second part of the photoresist pattern;

removing the conductive metallic layer, the impurity-doped amorphous silicon layer and the intrinsic amorphous silicon layer by using the first part of the photoresist pattern as an etching mask; and removing the first part of the photoresist pattern.

5. The method according to claim 4, wherein the mask includes a light-transmitting portion, a light-blocking portion and a light-half transmitting portion, the light-transmitting portion corresponding to the gate pad, the light-blocking portion corresponding to the active layer, the data line and the data pad, the light-half transmitting portion corresponding to the other areas except the active layer, the data line and the data pad.

6. The method according to claim 4, wherein the conductive metallic layer includes molybdenum (Mo).

7. The method according to claim 2, wherein the third mask process includes:

forming a transparent conductive material layer on the substrate including the buffer metallic layer, the data line and the data pad;

forming a photoresist layer on the transparent conductive material layer and disposing a mask over the photoresist layer;

exposing the photoresist layer to light through the mask;

forming a first photoresist pattern, a second photoresist pattern, a third photoresist pattern, and a fourth photoresist pattern by developing the photoresist layer exposed to the light, the first photoresist pattern corresponding to the source and drain electrodes, the second photoresist pattern corresponding to the pixel electrode, the third photoresist pattern corresponding to the gate pad electrode, the fourth photoresist pattern corresponding to the data line and the data pad;

patterning the transparent conductive material layer using the first, second, third and fourth photoresist patterns as an etching mask to thereby form the source and drain electrodes, the pixel electrode, the gate pad electrode, the data pad electrode and an auxiliary pattern, wherein the auxiliary pattern covers the data line and is connected to the source electrode;

removing the buffer metallic layer and the ohmic contact layer between the source and drain electrodes; and removing the first, second, third and fourth photoresist patterns.

8. The method according to claim 7, wherein the transparent conductive material layer includes one of indium zinc oxide, indium tin zinc oxide, and indium tin oxide.

9. The method according to claim 1, wherein the second mask process further includes forming an intrinsic amorphous silicon pattern and an impurity-doped amorphous silicon pattern under the data line.

* * * * *